(12) United States Patent
Amagai

(10) Patent No.: US 8,687,242 B2
(45) Date of Patent: *Apr. 1, 2014

(54) IMAGE PROCESSING APPARATUS FOR OBTAINING IMAGE DATA COMPRISING A CODE GENERATION SECTION, AN ENCRYPTION SECTION, A PATTERN GENERATION SECTION, AND AN ADDITION SECTION

(75) Inventor: Takayuki Amagai, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 754 days.

This patent is subject to a terminal disclaimer.

(21) Appl. No.: 12/662,801

(22) Filed: May 4, 2010

(65) Prior Publication Data
US 2011/0002012 A1    Jan. 6, 2011

(30) Foreign Application Priority Data
May 13, 2009    (JP) .................................. 2009-116795

(51) Int. Cl.
*H04N 1/40* (2006.01)
(52) U.S. Cl.
USPC ........................................ 358/3.28; 358/468
(58) Field of Classification Search
USPC ................................................. 358/1.1–1.16
See application file for complete search history.

(56) References Cited

U.S. PATENT DOCUMENTS

| 5,128,885 A * | 7/1992 | Janis et al. ........................ 714/45 |
| 2006/0097062 A1 * | 5/2006 | Cheong et al. ................. 235/494 |
| 2007/0177824 A1 * | 8/2007 | Cattrone et al. ............... 382/306 |
| 2010/0195834 A1 | 8/2010 | Amagai |
| 2010/0321739 A1 | 12/2010 | Amagai |

FOREIGN PATENT DOCUMENTS

JP    2003-91697    3/2003

OTHER PUBLICATIONS

K. Ito et al. "Paper Document Security" Fuji Xerox technical report No. 15 2005; p. 32-41.
Non-Final Office Action issued on Mar. 1, 2013 in related U.S. Appl. No. 12/803,238.
Notice of Allowance issued on Aug. 27, 2013 in related U.S. Appl. No. 12/803,238.

* cited by examiner

Primary Examiner — Benny Q Tieu
Assistant Examiner — Michael Y Tzeng
(74) Attorney, Agent, or Firm — Edwards Wildman Palmer LLP; David G. Conlin; Edmund J. Koundakjian

(57) ABSTRACT

In a digital multi-function peripheral, a QR code generation section generates image data of a QR code on the basis of first data for security of obtained image data. An encryption section encrypts second data for security of the image data. A micro gradation generation section generates a micro gradation (a gradation pattern) on the basis of the second data having been encrypted by the encryption section and history data, and adds the micro gradation to the image data of the QR code generated by the micro gradation QR code generation section.

16 Claims, 21 Drawing Sheets

FIG. 5

QR CODE DATA 1 (BLACK)
MICRO GRADATION DATA 0

| 0 | 10 | 20 | 30 | 30 | 30 | 30 | 30 |
|---|---|---|---|---|---|---|---|
| 10 | 10 | 20 | 30 | 20 | 20 | 20 | 30 |
| 20 | 20 | 20 | 30 | 10 | 10 | 20 | 30 |
| 30 | 30 | 30 | 30 | 0 | 10 | 20 | 30 |
| 30 | 20 | 10 | 0 | 30 | 30 | 30 | 30 |
| 30 | 20 | 10 | 10 | 30 | 20 | 20 | 20 |
| 30 | 20 | 20 | 20 | 30 | 20 | 10 | 10 |
| 30 | 30 | 30 | 30 | 30 | 20 | 10 | 0 |

QR CODE DATA 0 (WHITE)
MICRO GRADATION DATA 0

| 225 | 235 | 245 | 255 | 255 | 255 | 255 | 255 |
|---|---|---|---|---|---|---|---|
| 235 | 235 | 245 | 255 | 245 | 245 | 245 | 255 |
| 245 | 245 | 245 | 255 | 235 | 235 | 245 | 255 |
| 255 | 255 | 255 | 255 | 225 | 235 | 245 | 255 |
| 255 | 245 | 235 | 225 | 255 | 255 | 255 | 255 |
| 255 | 245 | 235 | 235 | 255 | 245 | 245 | 245 |
| 255 | 245 | 245 | 245 | 255 | 245 | 235 | 235 |
| 255 | 255 | 255 | 255 | 255 | 245 | 235 | 225 |

QR CODE DATA 1 (BLACK)
MICRO GRADATION DATA 1

| 30 | 30 | 30 | 30 | 30 | 20 | 10 | 0 |
|---|---|---|---|---|---|---|---|
| 30 | 20 | 20 | 20 | 30 | 20 | 10 | 10 |
| 30 | 20 | 10 | 10 | 30 | 20 | 20 | 20 |
| 30 | 20 | 10 | 0 | 30 | 30 | 30 | 30 |
| 30 | 30 | 30 | 30 | 0 | 10 | 20 | 30 |
| 20 | 20 | 20 | 30 | 10 | 10 | 20 | 30 |
| 10 | 10 | 20 | 30 | 20 | 20 | 20 | 30 |
| 0 | 10 | 20 | 30 | 30 | 30 | 30 | 30 |

QR CODE DATA 0 (WHITE)
MICRO GRADATION DATA 1

| 255 | 255 | 255 | 255 | 255 | 245 | 235 | 225 |
|---|---|---|---|---|---|---|---|
| 255 | 245 | 245 | 245 | 255 | 245 | 235 | 235 |
| 255 | 245 | 235 | 235 | 255 | 245 | 245 | 245 |
| 255 | 245 | 235 | 225 | 255 | 255 | 255 | 255 |
| 255 | 255 | 255 | 255 | 225 | 235 | 245 | 255 |
| 245 | 245 | 245 | 255 | 235 | 235 | 245 | 255 |
| 235 | 235 | 245 | 255 | 245 | 245 | 245 | 255 |
| 225 | 235 | 245 | 255 | 255 | 255 | 255 | 255 |

IMAGE PROCESSING APPARATUS FOR OBTAINING IMAGE DATA COMPRISING A CODE GENERATION SECTION, AN ENCRYPTION SECTION, A PATTERN GENERATION SECTION, AND AN ADDITION SECTION

CROSS-REFERENCE TO RELATED APPLICATIONS

This Nonprovisional application claims priority under 35 U.S.C. §119(a) on Patent Application No. 2009-116795 filed in Japan on May 13, 2009, the entire contents of which are hereby incorporated by reference. (Only for US)

BACKGROUND

1. Technical Field

The present invention relates to an image processing apparatus for processing obtained image data, an image reading apparatus including the image processing apparatus, an image forming apparatus including the image processing apparatus, and a computer-readable recording medium recording a computer program for making a computer process obtained image data.

2. Description of Related Art

Electronization of information has been largely proceeded as well as printers, copying machines and multi-function printers have been widely spread these days. This results in increasing cases where document data is created on the basis of a document of a sheet-shaped recording medium (hereinafter simply referred to as a document) so as to deliver the created document data.

On the other hand, as a method for adding additional data to a printed matter, a method using a two-dimensional code has been widely spread. An example of the two-dimensional code is a QR (Quick Response) code. Cellular phones now widespread among a large number of people are equipped with a function to read a QR code. Also, a function to create a QR code is provided as a function of a cellular phone in some cases and is provided as software for a computer in other cases.

When a QR code is added to a document, additional data of the QR code can be embedded in consideration of the layout of the document without requiring a separate area for adding the code and substantially without making human eyes recognize degradation of the image quality of the document. Other data embedding techniques having such characteristics have been also developed. For example, a micro gradation is disclosed in "Security of Paper Document", Kensuke Ito and four others, [online] Fuji Xerox Technical Report, [searched on Nov. 29, 2008], <URL on the Internet: http://www.fujizerox.co.jp/company/tr/15/download/pdf/t_4.pdf> (hereinafter designated as Known Document 1). A micro gradation is a technique to embed additional data in a design of the document with the design regarded as a page background. The additional data is binarized to be expressed as a prescribed pattern with gradation.

On the other hand, as a method for restraining unexpected copying of a document, a text hiding technique using visible watermark information in halftone screens is known. In the text hiding technique using visible watermark information in halftone screens, a fact that a printer has higher resolution than a scanner is utilized. More specifically, as illustrated in FIG. 20A, a hidden text "Copy Strictly Prohibited" is printed with resolution readable with a scanner. A pattern (a background of visible watermark information in halftone screens) is printed all over the printed surface of a recording medium of paper or the like with resolution not readable with a scanner so that the hidden text "Copy Strictly Prohibited" cannot be noticed by human eyes. Thus, a document as illustrated in FIG. 20B is obtained. As a result, when the document of FIG. 20A is copied, a scanner cannot read the background of the visible watermark information in halftone screens but reads the hidden text "Copy Strictly Prohibited" alone, and hence, a printer does not print the background of the visible watermark information in halftone screens but prints the hidden text. Accordingly, the document of FIG. 20B is copied, and thus, copying can be restrained.

SUMMARY

Once a document created by printing document data on a recording medium such as paper is off creator's hands, however, it is difficult to clarify the handling history of the document (the document data). The handling history of a document includes by whom the document was created, from whom the document was sent, whether or not the document was obtained through a proper channel and the like. Furthermore, since it is difficult to clarify the handling history of a document, it is sometimes difficult to check the contents of the document. Moreover, a third party not expected by the creator of a document can easily copy the document and execute reading and the like of the document. Therefore, there has been a problem in security of a document.

Although the copying can be restrained by the text hiding technique using visible watermark information in halftone screens because the hidden text "Copy Strictly Prohibited" is copied in copying the document, but there remains a problem that the copying itself cannot be prevented by this technique. Furthermore, there is a problem that the handling history of a document cannot be checked.

Also, there is a prescribed limit in the data quantity to be accommodated in a QR code. When a QR code of Standard version 40 (177×177) is used, the maximum number of "kanji characters" or "kana characters" that can be accommodated in the QR code is 1817. Furthermore, when a QR code is printed on a recording medium such as paper, the area occupied by the QR code is preferably smaller from the viewpoint of the layout or the appearance of the document. The QR code requires, however, a prescribed area in accordance with resolution of a reading apparatus. For example, when a QR code is read with a camera function of a cellular phone, each cell included in the QR code requires an area of approximately 1 mm square.

In the micro gradation described in Known Document 1, however, it is difficult to estimate a design (or a set of dots) corresponding to a page background. Also, when the design includes a high frequency component, it is also difficult to read a pattern embedded in the design. In order to avoid such problems, complicated processing is required. Moreover, since human eyes do not clearly recognize the degradation of the image quality of the design, when, for example, a camera function of a cellular phone is used for reading, there are problems that it is not clear "whether or not information is embedded in the design" or "in which portion of the design information is embedded".

The present invention was devised in consideration of the aforementioned circumstances, and an object is providing an image processing apparatus, an image processing method and a recording medium in which security for image data can be improved and a history of processing of the image data can be checked by visibly adding data for the security and history data as much as possible in a limited space during, for example, output processing of the image data without being affected by a high frequency component such as a fine line pattern.

Another object of the invention is providing an image processing apparatus, an image processing method and a recording medium in which security in processing of image data can be improved, unexpected processing of the image data can be prevented and a history of the processing of the image data can be appropriately checked after the processing.

Still another object of the invention is providing an image reading apparatus in which data for security and history data as much as possible can be visibly added in a limited space and a history of processing of the image data can be checked during, for example, output processing of image data read from a document.

Still another object of the invention is providing an image reading apparatus in which, for example, during processing of read image data or an image based on the image data, security can be improved, unexpected processing of the image data or the image can be prevented and a history of processing of the read image data (or the image) can be appropriately checked.

Still another object of the invention is providing an image forming apparatus in which, in the case where an image is to be formed on, for example, a sheet (namely, in the case where image data is output onto a sheet), data for security and history data as much as possible can be visibly added in a limited space and a history of processing of the image data can be checked.

Still another object of the invention is providing an image forming apparatus in which, in the case where an image based on image data is to be formed on a sheet, security can be improved, unexpected image formation based on the image data can be prevented and a history of processing of the image data can be appropriately checked after image formation.

The image processing apparatus of the invention is an image processing apparatus for obtaining image data and performing a processing of the obtained image data and includes a code generation section for generating image data of a two-dimensional code including a plurality of cells on the basis of first data for security of the obtained image data; an encryption section for encrypting second data for security of the obtained image data; a pattern generation section for generating pattern image data expressing a gradation pattern in each cell of the two-dimensional code on the basis of the encrypted second data and history data corresponding to a history of the processing; and an addition section for adding, to the obtained image data, additional image data to be added to the obtained image data on the basis of the generated image data of the two-dimensional code and the generated pattern image data.

According to this invention, when the image data is obtained, the code generation section generates the image data of the two-dimensional code on the basis of the first data. The encryption section encrypts the second data. The pattern generation section generates the pattern image data on the basis of the encrypted second data and the history data. The addition section adds the additional image data to the obtained image data on the basis of the generated image data of the two-dimensional code and the generated pattern image data.

In the image processing apparatus of the invention, gradation patterns respectively corresponding to the encrypted second data and the history data are expressed in the two-dimensional code respectively in different areas.

According to this invention, the gradation pattern is expressed in each cell of the two-dimensional code on the basis of the pattern image data generated by the pattern generation section. The gradation pattern corresponding to the encrypted second data and the gradation pattern corresponding to the history data are respectively expressed in the different areas.

The image processing apparatus of this invention includes an obtaining section for obtaining image data to which the additional image data has been added by the image processing apparatus of the aforementioned invention; a separation section for separating the first data, the second data and the history data from the additional image data; a matching section for matching the first data and the second data separated by the separation section with each other; a process section for executing a processing of the image data in accordance with a result of match obtained by the matching section and/or the history data; and a history update section for updating the history data in executing the processing.

According to this invention, the obtaining section obtains the image data to which the additional image data generated by the image processing apparatus of the aforementioned invention has been added. The separation section separates the first data, the second data and the history data from the additional image data. The matching section matches the first data and the second data separated by the separation section. Thereafter, the image data is processed in accordance with the result of the match and/or the history data. In processing the image data, the history update section updates the history data.

In the image processing apparatus of the invention, the history update section includes a history addition section for adding, in executing a processing, process log data corresponding to a job which is carried out to the history data not updated yet; and an updated pattern generation section for generating pattern image data expressing a gradation pattern in each cell of the two-dimensional code on the basis of the updated history data to which the process log data has been added.

According to this invention, the history update section includes the history addition section and the updated pattern generation section. The history addition section adds the process log data to the history data not updated yet. The updated pattern generation section generates the pattern image data on the basis of the updated history data to which the process log data has been added. Thus, the history data is updated.

In the image processing apparatus of the invention, the history update section further includes a determination section for determining whether or not the history data is able to be updated on the basis of a capacity of the updated history data or the process log data.

According to this invention, the capacity of the history data that can be expressed with the two-dimensional code is limited. Therefore, the determination section can determine on the basis of the capacity of the updated history data or the process log data whether or not the history data can be updated.

The image processing apparatus of the invention further includes an updated additional image addition section for adding, to the image data, updated additional image data including the pattern image data generated by the updated pattern generation section instead of the additional image data in accordance with a result of determination obtained by the determination section.

According to this invention, when the determination section determines that the history data can be updated, the updated additional image addition section adds the updated additional image data to the image data instead of the additional image data.

The image processing apparatus of the invention further includes an output section for performing output on the basis of the history data.

According to this invention, an image based on, for example, the history data can be outputted, so as to allow a user to check the history.

The image processing apparatus of the invention further includes a receiving section for receiving third data from outside, and the matching section matches the third data received by the receiving section with the first data or the second data.

According to this invention, the receiving section receives, for example, a user name as the third data. The matching section matches the user name (the third data) with the first data or the second data. Thereafter, the processing is executed in accordance with the result of the match.

The image reading apparatus of the invention includes the image processing apparatus according to the aforementioned invention, and the image processing apparatus adds the additional image data to image data read from a document.

According to this invention, the code generation section generates the image data of the two-dimensional code, and the pattern generation section generates the pattern image data. The addition section adds the additional image data based on the image data of the two-dimensional code and the pattern image data to the image data read from the document.

The image reading apparatus of the invention includes the image processing apparatus according to the aforementioned invention; and a read section for reading image data to which the additional image data has been added from a document, and in a case where the read section reads the image data, the separation section separates the first data, the second data and the history data from the additional image data, a processing of the read image data is executed in accordance with a result of match obtained by the matching section and/or the history data, and the history data is updated in executing the processing.

According to this invention, the read section reads the image data generated by adding the additional image data by the image processing apparatus for obtaining image data and performing a processing of the obtained image data. In this case, the separation section of the image processing apparatus of the aforementioned invention separates the first data, the second data and the history data from the additional image data, and the matching section matches the first data and the second data with each other. The read image data is processed in accordance with the result of the match obtained by the matching section and/or the history data.

The image forming apparatus includes the image processing apparatus according to the aforementioned invention, and an image based on image data to which the additional image data has been added by the image processing apparatus is formed on a sheet.

According to this invention, the image processing apparatus generates the output image data to which the additional image data has been added to prescribed image data. The image based on the output image data is formed on, for example, a sheet.

The image forming apparatus of the invention includes the image processing apparatus according to the aforementioned invention, and in a case where image data to which the additional image data has been added is obtained, an image based on the obtained image data is formed on a sheet in accordance with a result of match obtained by the matching section and/or history data of the image data, and the history data is updated in forming the image.

According to this invention, in the case where the image data to which the additional image data has been added is obtained, the matching section executes the match. The image based on the obtained image data is formed on, for example, a sheet in accordance with the result of the match and/or the history data of the image data.

The image processing method of the invention employed for obtaining image data and performing a processing of the obtained image data includes a code generation step of generating image data of a two-dimensional code including a plurality of cells on the basis of first data for security of the obtained image data; an encryption step of encrypting second data for security of the obtained image data; a pattern generation step of generating pattern image data expressing a gradation pattern in each cell of the two-dimensional code on the basis of the encrypted second data and history data corresponding to history of the processing; and an addition step of adding, to the obtained image data, additional image data to be added to the obtained image data on the basis of the generated image data of the two-dimensional code and the generated pattern image data.

The computer-readable recording medium of the invention is a recording medium which is recorded a computer program for making a computer obtain image data and perform a processing of the obtained image data, and the computer program includes a code generation step of causing the computer to generate image data of a two-dimensional code including a plurality of cells on the basis of first data for security of the obtained image data; an encryption step of causing the computer to encrypt second data for security of the obtained image data; a pattern generation step of causing the computer to generate pattern image data expressing a gradation pattern in each cell of the two-dimensional code on the basis of the encrypted second data and history data corresponding to history of the processing; and an addition step of causing the computer to add, to the obtained image data, additional image data to be added to the obtained image data on the basis of the generated image data of the two-dimensional code and the generated pattern image data.

According to this invention, the image data of the two-dimensional code is generated on the basis of the first data for security of the obtained image data. The second data for security of the obtained image data is encrypted. The pattern image data expressing the gradation pattern in each cell of the two-dimensional code is generated on the basis of the encrypted second data and the history data. Also, the additional image data based on the image data of the two-dimensional code and the pattern image data is added to the image data.

The image processing method of the invention includes an obtaining step of obtaining the image data to which the additional image data has been added by the image processing method according to the aforementioned invention; a separation step of separating the first data, the second data and the history data from the additional image data; a matching step of matching the first data and the second data separated in the separation step; a process step of executing a processing of the image data in accordance with a result of match obtained in the matching step and/or the history data; and a history update step of updating the history data in executing the processing.

The computer-readable recording medium of the invention is a recording medium recording a computer program, and the computer program includes an obtaining step of causing a computer to obtain image data to which the additional image data has been added by the computer program recorded in the recording medium according to the aforementioned invention; a separation step of causing the computer to separate the first data, the second data and the history data from the additional image data; a matching step of causing the computer to match the first data and the second data separated in the separation step; a process step of causing the computer to execute a processing of the image data in accordance with a result of match obtained in the matching step and/or the history data; and a history update step of causing the computer to update the history data in executing the processing.

According to this invention, the image data to which the additional image data has been added is obtained. The first data, the second data and the history data are separated from the additional image data. The image data is processed in accordance with the result of the match of the first data and the second data having been separated and/or the history data. In processing the image data, the history data is updated.

In the image processing method of the invention, the history update step includes a history addition step of adding process log data corresponding to a job which is carried out to the history data not updated yet in executing the processing; and a history pattern generation step of generating pattern image data expressing a gradation pattern in each cell of the two-dimensional code on the basis of the updated history data to which the process log data has been added.

In the recording medium of the invention, the history update step includes a history addition step of causing the computer to add process log data corresponding to a job which is carried out to the history data not updated yet in executing the processing; and a history pattern generation step of causing the computer to generate pattern image data expressing a gradation pattern in each cell of the two-dimensional code on the basis of the updated history data to which the process log data has been added.

According to this invention, when prescribed processing is executed, the history data is updated by adding the process log data of the prescribed processing to the history data not updated yet and generating the pattern image data expressing the gradation pattern in each cell of the two-dimensional code on the basis of the updated history data to which the process log data has been added.

In the image processing method of the invention, the history update step includes a determination step of determining whether or not the history data is able to be updated on the basis of a capacity of the updated history data or the process log data.

In the recording medium of the invention, the history update step includes a determination step of causing the computer to determine whether or not the history data is able to be updated on the basis of a capacity of the updated history data or the process log data.

According to this invention, the capacity of the history data that can be expressed with the two-dimensional code is limited. Therefore, it can be determined whether or not the history data can be updated on the basis of the capacity of the updated history data or the process log data.

According to the present invention, first data and second data are concerned with security of prescribed image data. History data corresponds to a history of processing of the image data. Gradation patterns respectively based on the second data and the history data are expressed in a two-dimensional code based on the first data. Therefore, the two-dimensional code includes no high frequency component, and hence, there is no need to perform complicated processing for avoiding influence of a high frequency component in reading the history data expressed in the two-dimensional code. Furthermore, a larger amount of data for security can be added in a limited space visually and efficiently. Moreover, a user can check the history of the processing of the image data, so as to prevent unexpected copying.

According to the present invention, the image data is processed on the basis of the first data, the second data and the history data. Since the history data is updated in processing the image data, the security in the processing of the image data is improved. Also, unexpected processing of the image data can be prevented. Moreover, the history of processing of the image data to be executed after the processing can be appropriately checked.

The above and further objects and features will more fully be apparent from the following detailed description with accompanying drawings.

BRIEF DESCRIPTION OF THE SEVERAL
VIEWS OF THE DRAWINGS

FIG. 5 is an exemplary diagram illustrating examples of a table of a combination of densities of micro gradation data expressed in cells of a QR code in Embodiment 1;

DETAILED DESCRIPTION

Now, an image processing apparatus, an image reading apparatus, an image forming apparatus, an image processing method and a recording medium according to the invention will be specifically described. In the following embodiments, application to a digital multi-function peripheral having a copying function, a printing function and the like will be described with reference to the accompanying drawings. It is noted that a QR code is used as a two-dimensional code for convenience of the description.

Embodiment 1

Figure 1:
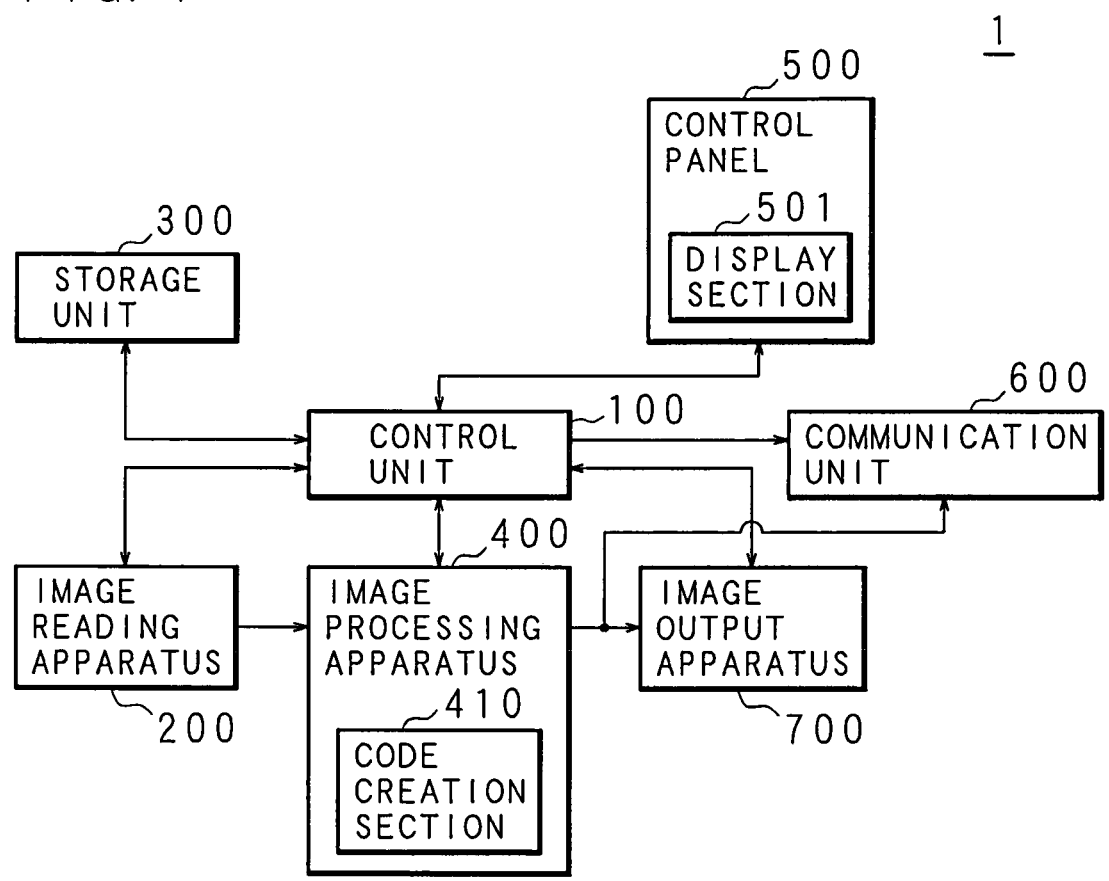
FIG. 1 is a block diagram illustrating a principal configuration of a digital multi-function peripheral according to Embodiment 1.

FIG. 1 is a block diagram illustrating a principal configuration of a digital multi-function peripheral 1 according to Embodiment 1. The Digital Multi-Function Peripheral 1 of Embodiment 1 includes a control unit 100, an image reading apparatus 200, an image processing apparatus 400, an image output apparatus 700, a storage unit 300, a communication unit 600 and a control panel 500.

The control unit 100 includes a CPU for controlling the hardware and a RAM (Random Access Memory) for temporarily storing data (such as a public key described later) necessary for the control. Furthermore, a part of the RAM is used as a job storing area for storing job data (process log data). In the job data, specific data received from a user through the control panel 500 is associated with the executed processing, the date of the execution and the like. The executed processing is copying, printing, transmission of a facsimile or the like, and the date is obtained on the basis of a timer (not shown).

The storage unit 300 is, for example, a nonvolatile semiconductor memory and stores data in which a user name, a password of each user, a secret key of each user, a public key of each user and the like are associated with one another. Also, the storage unit 300 precedently stores the following programs: a control program for controlling hardware used for processing image data; a program for specifying a position for printing a gradation QR code corresponding to encrypted second data and history data described later; a program for generating a secret key or a decoding key used for encryption of second data; a program for adding image data of a gradation QR code; a program for displaying an input screen for urging input of a user name and a password; and a program for displaying a selection screen for receiving selection whether or not processing is to be continued.

The control unit 100 loads a prescribed program from the storage unit 300 if necessary and executes the loaded program. Thus, the digital multi-function peripheral 1 functions as an image forming apparatus equipped with the image processing apparatus and the image reading apparatus of the invention.

Furthermore, the control panel 500 includes function buttons related to significant functions of the digital multi-function peripheral, numeric keys, an enter key, moving keys and a display section 501. The function buttons are buttons for instructing execution of "transmission of a facsimile", "copying", "printing", "transmission of an e-mail" and the like. The enter key is a key for defining a received instruction. The moving keys are keys for specifying a position of a QR code described later. The display section 501 is a liquid crystal display or the like. When any of the function buttons of the control panel 500 is operated by a user, data on the function related to the operated function button (i.e., the executed processing) is associated with specific data received from the user through the control panel 500 to be stored in the job storing area of the RAM. Also, the control panel 500 further includes a "history display" button. The "history display" button is a button for receiving, from a user, an instruction to display an image based on history data described later on the display section 501.

The image reading apparatus 200 optically reads a document to be processed so as to obtain image data of the document. Moreover, the image reading apparatus 200 includes an optical unit (a read section). The optical unit includes a light source for irradiating a document, such as an image sensor like a CCD (Charge Coupled Device), for reading a document. The image reading apparatus 200 makes an optical image, which is obtained through reflection from a document set in a prescribed reading position, focus on the image sensor, so as to output analog electric signals of RGB (R: red, G: green and B: blue). The analog electric signals outputted from the image reading apparatus 200 are inputted to the image processing apparatus 400.

The communication unit 600 includes a network card, a modem and the like so as to send image data having been processed by the image processing apparatus 400 to the external device. For example, the communication unit 600 sends an e-mail with image data attached to a specified destination.

The image output apparatus 700 forms an image based on image data outputted from the image processing apparatus 400 by outputting the image onto a sheet such as recording paper or an OHP film. For this purpose, the image output apparatus 700 includes a photosensitive drum, a charger, a laser writing device, a developer, a transferring device and the like (not shown). The charger charges the photosensitive drum with a prescribed potential. The laser writing device forms an electrostatic latent image on the photosensitive drum by emitting laser beams in accordance with received image data from outside. The developer develops the electrostatic latent image formed on the photosensitive drum by supplying a toner. The transferring device transfers a toner image thus formed on the photosensitive drum onto paper. The image output apparatus 700 forms an image desired by a user on a sheet by employing an electrophotographic method. Incidentally, although the image output apparatus 700 herein includes the laser writing device and forms an image by the electrophotographic method, it may be an apparatus for forming an image by an ink-jet method, a thermal transferring method, a sublimation method or the like. The image processing apparatus 400 obtains image data and processes the image data in accordance with the type of each image.

The image processing apparatus 400 may obtain an image by, for example, a method in which image data of a digital format is generated on the basis of analog electric signals inputted through the image reading apparatus 200, a method in which image data stored in the storage unit 300 is read, or the like. After processing the image data, the image processing apparatus 400 generates output image data. Furthermore, the image processing apparatus 400 includes a code creation section 410. The code creation section 410 generates image data of a gradation QR code described later to be added to image data to be outputted or image data based on analog electric signals inputted through the image reading apparatus 200. Thereafter, the image processing apparatus 400 adds the image data of the gradation QR code to the image data to be outputted or the image data based on the analog electric signals inputted through the image reading apparatus 200. The output image data to which the image data of the gradation QR code has been added is outputted to the image output apparatus 700 or the communication unit 600.

Figure 2:
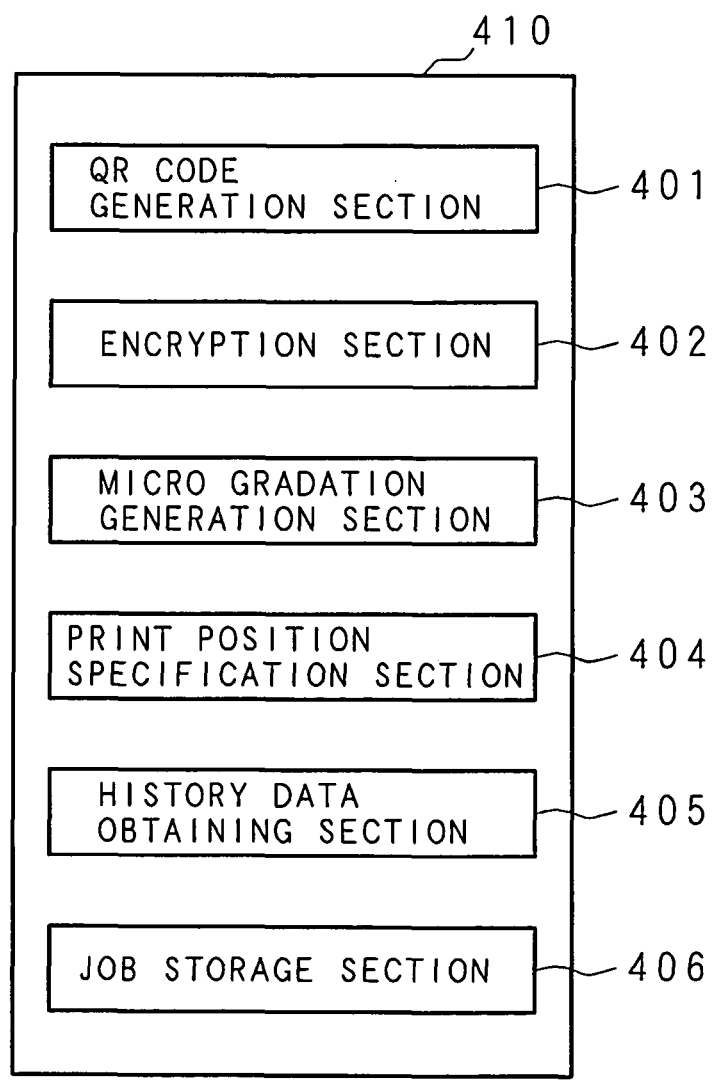
FIG. 2 is a block diagram illustrating a principal configuration of a code creation section of the digital multi-function peripheral of Embodiment 1.

FIG. 2 is a block diagram illustrating a principal configuration of the code creation section 410 of the digital multi-function peripheral 1 of Embodiment 1. The code creation section 410 includes a QR code generation section 401, an encryption section 402, a micro gradation generation section 403, a print position specification section 404, a history data obtaining section 405 and a job storage section 406.

The QR code generation section 401 generates image data of a QR code to be added to image data having been obtained from the image reading apparatus 200 on the basis of first data for security in printing an image based on the obtained data, in sending an e-mail having the obtained image attached, in externally transmitting the obtained image data, or the like.

The encryption section 402 encrypts second data for security by using, for example, a secret key possessed by a creator of the image data obtained from the image reading apparatus 200 in printing an image based on the obtained data, in sending an e-mail having the obtained image attached, in externally transmitting the obtained image data, or the like.

The first data and the second data are a name, an ID (IDentification) number, a contact address and the like of a creator or a user of image data and are data by which the creator or the user of the image data may be specified. Furthermore, the first data and the second data are not always identical to each other but may be different from each other.

At this point, a secret key and a public key are widely used in a "public cryptography" in general. Now, procedures in processing of "digital signature" employing the public cryptography will be simply described.

(1) A creator (a sender) of electronic data of a document prepares (creates) a secret key and a public key. (2) The creator (the sender) of the electronic data informs a receiver of the electronic data of the public key by using an e-mail, Web, a letter or the like. (3) The creator (the sender) of the electronic data encrypts the electronic data by using the secret key created in the procedure (1) and sends the encrypted electronic data to the receiver by using an e-mail, FTP (File Transfer Protocol), a printed matter or the like. (4) The receiver having received the encrypted electronic data decodes the encrypted electronic data sent in the procedure (3) by using the public key sent in the procedure (2). (5) When the encrypted electronic data can be decoded in the procedure (4), the creator (the sender) of the electronic data can be specified.

Furthermore, RSA (Rivest-Shamir-Adleman) cryptography is generally known about encryption and decode executed by using a secret key and a public key. Now, the outline of the RSA cryptography will be described.

A public key of the RSA cryptography is composed of a pair of natural numbers e and n, wherein n is a product of two prime numbers p and q, and e is a positive integer satisfying gcd (e, $\phi$(n))=1 (gcd: greatest common divisor). At this point, $\phi$(n) is the Euler function and is represented as $\phi$(n)=$\phi$(p)$\phi$(q) =(p−1)(q−1). It is assumed that there is an inverse element of the number e modulo $\phi$(n), which is indicated as d (1≤d≤p−1). In this case, a relationship of ed≡1 (mod $\phi$(n)) holds. At this point, a relationship of $x^{ed} \equiv x$ (mod n) holds with respect to x (0≤x<n) in accordance with the Euler's theorem. Accordingly, when the number d is known, x can be obtained on the basis of $x^e$ owing to the aforementioned properties. In other words, a cipher $x^e$ is created by encrypting x (0≤x≤n) by using the number e (e: encrypting key (secret key)). The cipher $x^e$ is decoded by using the number d (d: decoding key (a public key)).

Incidentally, the secret key thus obtained may be inputted through a keyboard or the like when, for example, the document creator creates the document. Furthermore, the secret key may be precedently stored in the storage unit 300 in association with identification data of the user. In the following description, it is assumed that the secret key is precedently stored in the storage unit 300.

The micro gradation generation section 403 generates image data of a micro gradation (a gradation pattern) on the basis of the encrypted second data and history data. The second data is encrypted by the encryption section 402. The history data corresponds to accumulation of job data on the contents of processing having been executed on the prescribed image data. The micro gradation is expressed in each cell of the QR code and has a plurality of areas with different densities in the cell.

Figures 3A, 3B:
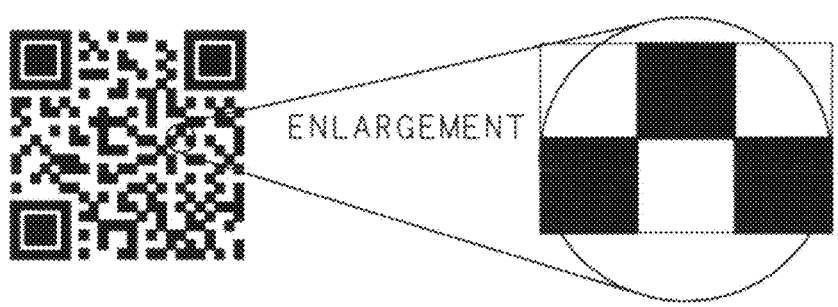
FIGS. 3A and 3B are explanatory diagrams explaining addition of second data (a micro gradation) performed by a micro gradation generation section of the digital multi-function peripheral of Embodiment 1.

Now, generation of a micro gradation and addition of a QR code executed by the micro gradation generation section 403 will be described. It is herein assumed that the micro gradation is created on the basis of the encrypted second data. FIGS. 3A and 3B are explanatory diagrams explaining addition of the second data (the micro gradation) performed by the micro gradation generation section 403 of the digital multi-function peripheral 1 of Embodiment 1. FIG. 3A illustrates an image of a QR code generated, for example, on the basis of a character string "This is a test.". FIG. 3B is an enlarged view of a part of the QR code of FIG. 3A (specifically, a circled portion of FIG. 3A). FIG. 3B illustrates information of "010101" assuming that a white portion indicates "0" and a black portion indicates "1".

Figure 4:
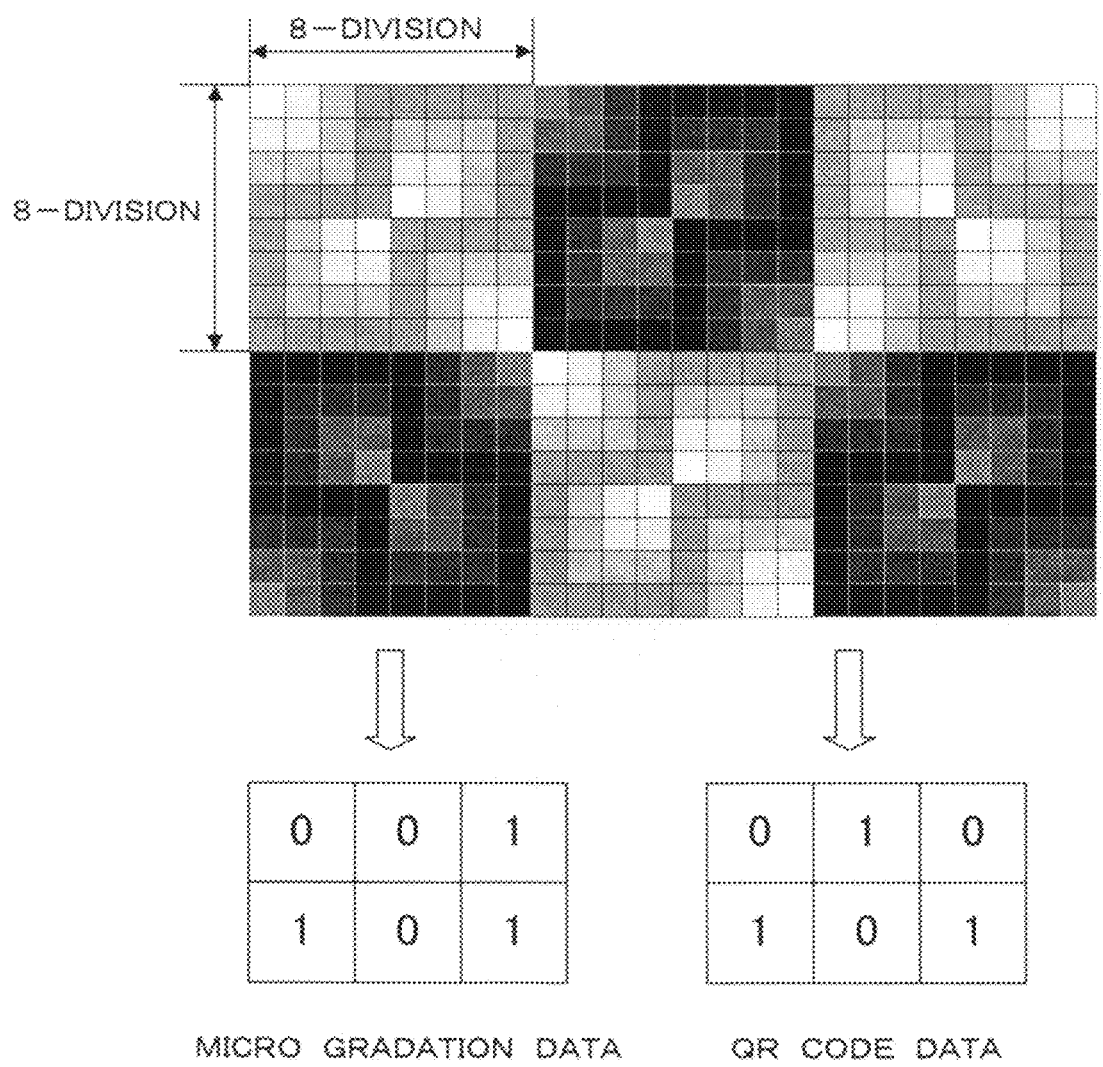
FIG. 4 is an exemplary diagram illustrating an exemplary QR code in which information of respective bits of encrypted second data "001100" is expressed by micro gradations in cells of a QR code of FIG. 3A.
Figure 6:
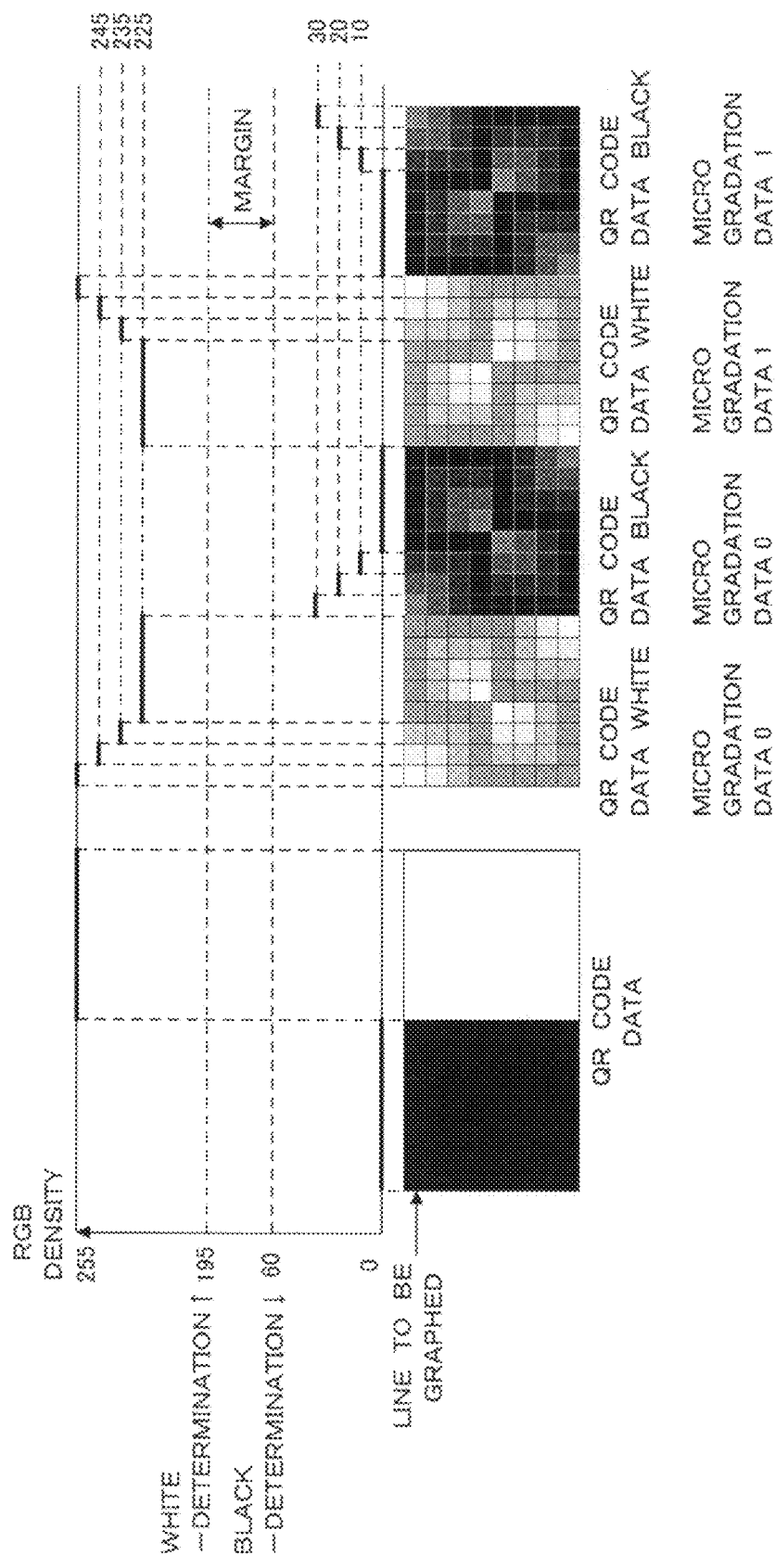
FIG. 6 is an explanatory diagram illustrating the structure and determination of a table of a combination of densities used in Embodiment 1.

FIG. 4 is an exemplary diagram illustrating an exemplary QR code in which information of the respective bits of the encrypted second data "001100" is expressed by micro gradations in cells (that is, areas painted with black or white) of the QR code of FIG. 3A. Each cell of the QR code is divided vertically and laterally by 8 respectively, so as to express, with one cell, 1 bit of the encrypted second data. The encrypted second data is generated by changing the densities of the respective blocks obtained by finely dividing the cell. Data "0" and data "1" are distinguished from each other in accordance with a difference between pattern images. The pattern images include pattern images of data "0" and "1" obtained when a cell of a QR code is black and pattern images of data "0" and "1" obtained when the cell of the QR code is white. FIG. 5 is an exemplary diagram illustrating examples of a table of a combination of densities of micro gradation data expressed in cells of a QR code in Embodiment 1. In FIG. 5, black and white are respectively represented as "0" and "255" by using RGB densities, and density distributions of the four kinds of pattern images expressed in cells are illustrated. As a RGB density is smaller, a color corresponding to the RGB density is closer to black, and as the RGB density is larger, a color corresponding to the RGB density is closer to white. FIG. 6 is an explanatory diagram illustrating the structure and determination of a table of a combination of densities used in Embodiment 1. In determination of the QR code generated on the basis of the first data, a cell having a density of 195 or more is determined as white, and a cell having a density of 60 or less is determined as black. In the determination of black and white, densities from 60 to 195 correspond to a margin. On the other hand, with respect to a micro gradation based on the encrypted second data, when a cell of a QR code is white, a color with a density of 0 through 30 is used for generating the micro gradation, and when a cell of the QR code is black, a color with a density of 225 through 255 is used for generating the micro gradation.

When a micro gradation representing information of 1 bit of the encrypted second data is generated in one cell of a QR code in this manner, no high frequency component is included as an element of the micro gradation. In other words, since the micro gradation is generated by adding gradation in what is called a solid area, a frequency component of a white line or a black line is never included. Accordingly, the micro gradation can be generated with a very simple structure. Furthermore, since the micro gradation never includes a high frequency component, the micro gradation can be simply read, and there is no need to perform complicated processing for reading it.

Figure 7:
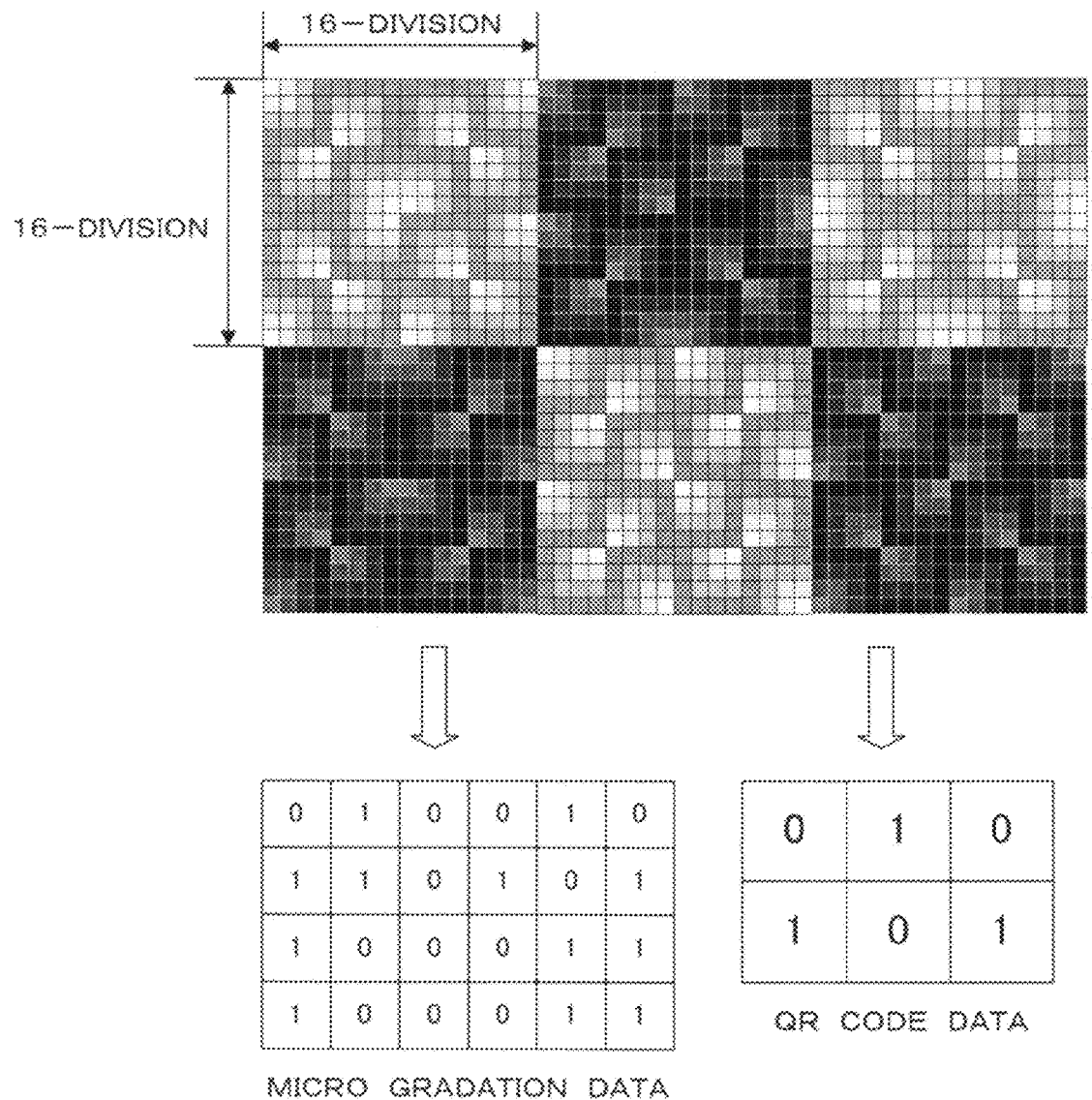
FIG. 7 is an exemplary diagram illustrating another example of the table of a combination of densities used in Embodiment 1.

In FIG. 4, one cell of the QR code expresses the information of 1 bit of the encrypted second data. When it is necessary to embed a larger amount of encrypted second data, however, the amount of data can be increased by four times by dividing one cell of a QR code vertically and laterally by 16 respectively as illustrated in FIG. 7. Each cell of a QR code is divided by a number corresponding to an integral multiple of 8. (More precisely, a number for dividing a cell depends upon the number of blocks necessary for a micro gradation to express information of 1 bit. In Embodiment 1, since the micro gradation expresses the information of 1 bit by using 8×8 blocks, the number for dividing a cell is an integral multiple of 8.) Incidentally, it is assumed in Embodiment 1 that the QR code and the micro gradation are respectively expressed by black and white data (K data).

Now, processing of the micro gradation generation section 403 for adding a micro gradation based on history data to a QR code will be described. The description of the generation of the micro gradation based on the history data is herein omitted because it is substantially the same as the generation of the micro gradation based on the encrypted second data.

Figure 8B:
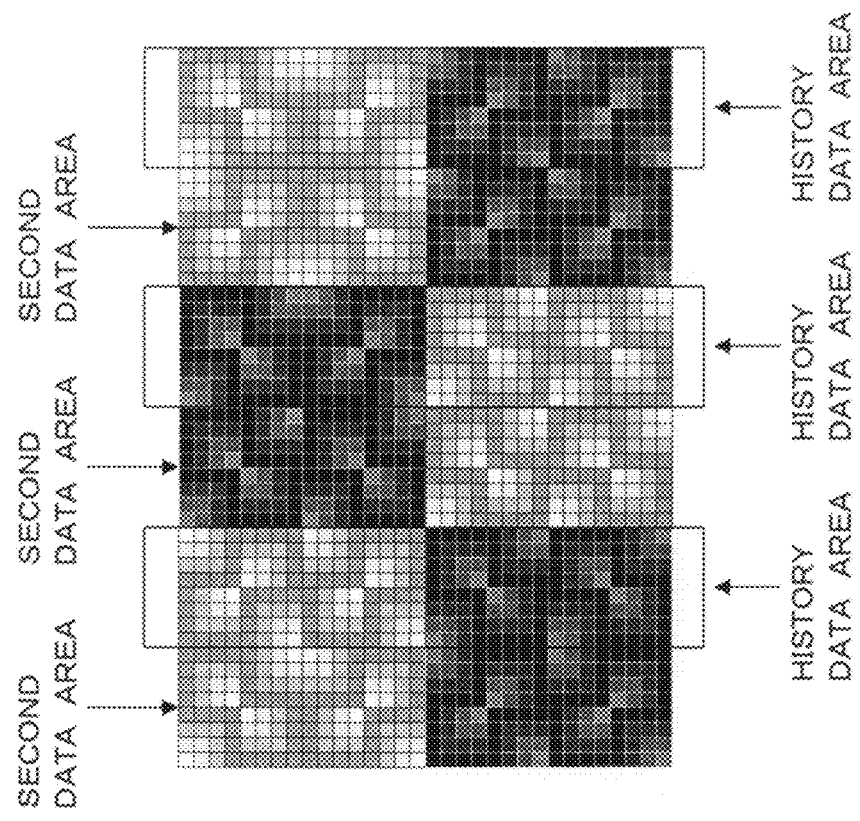
FIGS. 8A and 8B are explanatory diagrams illustrating addition of a micro gradation based on history data to a QR code performed in Embodiment 1.
Figure 8A:
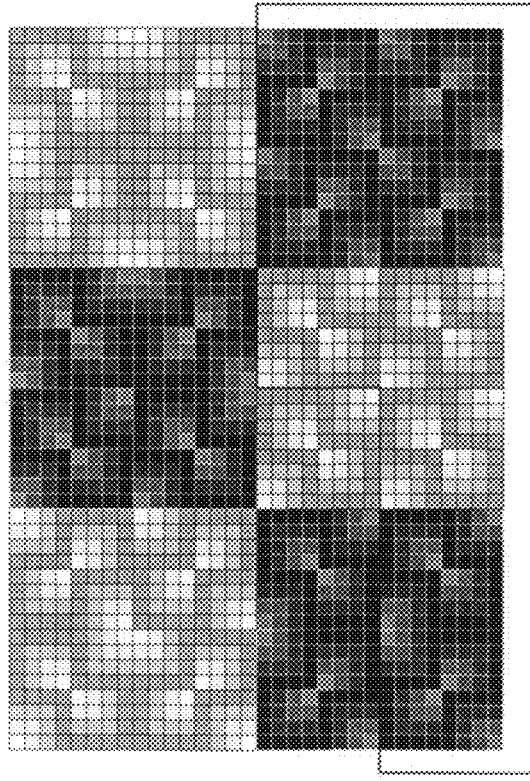

FIGS. 8A and 8B are explanatory diagrams illustrating addition of a micro gradation based on history data to a QR code performed in Embodiment 1.

For example, a user desiring to copy image data or the like by using the digital multi-function peripheral 1 does not have a secret key of a creator of the document. Therefore, when the document created by the document creator is subjected to new processing, a person having executed the processing cannot add job data corresponding to the job which is carried out to encrypted second data already generated as a micro gradation and encrypt the job data by using a secret key of the document creator. Now, a method for adding a micro gradation based on history data to a QR code (namely, for updating the QR code) will be described.

As a method for adding a micro gradation based on history data to a QR code, apart from the method for adding job data to encrypted second data already generated as a micro gradation, a method for expressing micro gradations respectively based on encrypted second data and history data in different areas of a QR code may be employed.

In order to express micro gradations respectively based on encrypted second data and history data in different areas of a QR code, it is necessary to detect a data capacity and an area available for addition of a micro gradation based on history data to be updated. As an example of the detection method, the capacity of the encrypted second data expressed as a micro gradation in creating the document is precedently stored in the QR code. The data capacity of micro gradations that can be expressed in one QR code (hereinafter referred to as the total capacity) is limited. In the case where each cell of a QR code having, for example, 14×14 cells is divided vertically and laterally by 8 respectively for expressing micro gradations in the cells (i.e., when data of 1 bit is expressed as a micro gradation in each cell), the capacity of data that can be expressed by the micro gradations, namely, the total capacity, is 14×14×1=196 bits. Alternatively, when each cell is divided vertically and laterally by 16 respectively, the total capacity is 14×14×4=784 bits.

Accordingly, the CPU of the control unit 100 can detect, in accordance with the total capacity and the capacity of the encrypted second data, the capacity that can be assigned to the history data in a QR code (hereinafter referred to as the assignable capacity) and an area usable for expressing a micro gradation based on the history data (hereinafter referred to as the assignable area). For example, in an exemplary QR code to which the micro gradation of FIG. 8A is added, the capacity of the encrypted second data expressed as the micro gradation is 15 bits in the QR code having 6 cells, and data corresponding to the capacity is recorded in the QR code. The CPU of the control unit 100 reads the data corresponding to the capacity of the encrypted second data from the QR code if necessary, and compares the total capacity of the QR code (that is, 24 bits in this case) with the capacity of the encrypted second data, so as to detect the assignable capacity (that is, 9 bits in this case) and the assignable area (that is, an area defined by a solid line in the drawing in this case).

As another method for defining an area where the micro gradation based on the history data to be updated can be added, an area for expressing a micro gradation based on encrypted second data (hereinafter referred to as the second data area) and an area for expressing a micro gradation based on history data (hereinafter referred to as the history data area) are precedently determined as a format in cells of a QR code. For example, in the exemplary QR code to which the micro gradation is added illustrated in FIG. 8B, each cell is divided vertically and laterally by 16 respectively and the data capacity that can be expressed as a micro gradation in one cell is 4 bits. Therefore, the total capacity of the QR code is 24 bits. Each cell is divided into right and left regions, and the left region is assigned as the second data area and the right region is assigned as the history data area (which is defined with a solid line in the drawing). In this case, each of the second data area and the history data area has a capacity of 12 bits.

In any of the aforementioned methods for defining an area for expressing a micro gradation based on history data, the history data can be updated by adding, every time processing is executed, job data of the processing to the existing history data not updated yet without using a secret key of a creator of a document. By adding the job data to the history data not updated yet, updated history data can be generated.

Incidentally, in the aforementioned method, when new processing is executed, the CPU of the control unit 100 generates updated history data by adding job data of the new processing to the existing history data. It can be determined on the basis of the capacity of the updated history data whether or not the updated history data can be accommodated in the assignable area or the history data area.

When the output image data is printed, the print position specification section 404 specifies a position where the QR code with the micro gradation added (hereinafter referred to as the gradation QR code) is to be recorded (hereinafter referred to as the print position) on recording paper. As a method for specifying the print position of a gradation QR code, the creator of the document arbitrarily inputs (specifies) the print position with the moving keys of the control panel 500 in creating the document. As another method, the gradation QR code is always printed in a constant position (for example, in a position at a right end of a header) by using a program.

The history data obtaining section 405 reads the history data from, for example, the history data area of the gradation QR code in accordance with an instruction issued by the CPU of the control unit 100.

The job storage section 406 newly records job data in the history data area of the gradation QR code or adds job data in the history data area. The job data is temporarily stored in the job storing area of the RAM and is added to the history data read by the history data obtaining section 405. The micro gradation generation section 403 generates image data of a micro gradation (a gradation pattern) on the basis of the history data to which the job data has been added, namely, the updated history data.

Now, processing of output image data generated by adding image data of a gradation QR code to image data obtained by the image reading apparatus 200 in the digital multi-function peripheral 1 of Embodiment 1 will be described in detail.

Figure 9:
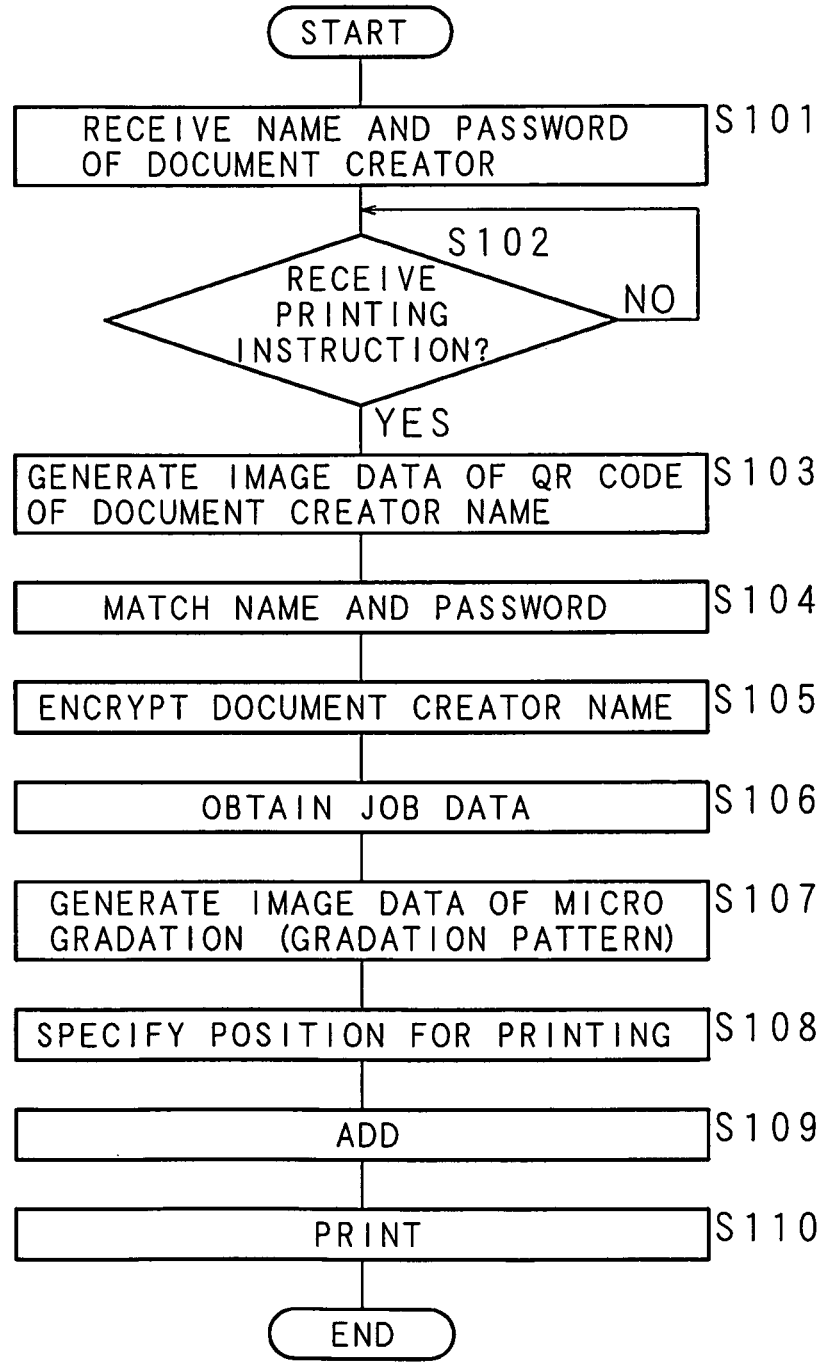
FIG. 9 is a flowchart of processing executed by a control unit when the digital multi-function peripheral creates image data of a gradation QR code and a document is created by adding the image of the gradation QR code to an image based on obtained image data.

FIG. 9 is a flowchart of processing executed by the control unit 100 when the digital multi-function peripheral 1 creates image data of a gradation QR code and a document is created by adding the image of the gradation QR code to an image based on obtained image data in Embodiment 1. For convenience, it is assumed in the following description that the first data and the second data are both a name of a creator of a document and that the digital multi-function peripheral 1 of Embodiment 1 is capable of editing image data through the control panel 500. Furthermore, it is also assumed that the creator of the document reads image data from a prescribed document, edits the image data and creates new image data. It is noted that this case is not the only case to be employed for describing the processing of output image data generated by adding image data of a gradation QR code to obtained image data. For example, the description may be given on a case where the digital multi-function peripheral 1 of Embodiment 1 is connected to electric equipment such as a PC (Personal Computer) or a PDA (Personal Digital Assistance) having a function to edit and create image data so as to edit image data by the electric equipment for creating new image data. Furthermore, for convenience, it is assumed in the following description that a second data area and a history data area are precedently defined as a format in cells of a QR code. A second data area corresponds to an area for expressing a micro gradation based on encrypted second data, and a history data area corresponds to an area for expressing a micro gradation based on history data.

The creator of the document first inputs, before reading a desired document, his/her name and password by operating the control panel 500. Thus, the CPU of the control unit 100 receives the name (first data) and the password of the document creator through the control panel 500 (Step S101). At this point, the description is given on a case where the creator of the document is one in number, and in the case where there are a plurality of creators of a document, names of the respective creators may be inputted. Alternatively, a number, a contact address or the like by which an individual can be specified may be inputted instead of the name. Alternatively, another material created by the creator of the document, a reference, update history of the document, a team member name or the like may be inputted.

Next, the creator of the document instructs the digital multi-function peripheral 1 to read a document. The CPU receives the instruction to read the document through the control panel 500 and makes the image reading apparatus 200 read the document. Image data read by the image reading apparatus 200 is temporarily stored in the storage unit 300. The display section 501 of the control panel 500 displays an image based on the read image data. The creator of the document edits the image data by operating the control panel 500 with, for example, referring to the image, so as to create new image data. When the edition of the image data is completed, the creator of the document presses the "printing" button of the control panel 500 for printing an image based on the edited image data on recording paper.

The CPU determines whether or not a printing instruction has been received from the user by, for example, monitoring an operation of the "printing" button of the control panel 500 (Step S102). When it is determined that a printing instruction has not been received (Step S102: NO), the CPU waits for reception of a printing instruction. On the other hand, when it is determined that a printing instruction has been received (Step S102: YES), the CPU generates image data of a QR code on the basis of the document creator name received in Step S101 (Step S103). This procedure is executed by the CPU instructing the QR code generation section 401 of the code creation section 410 to generate image data of a QR code based on the document creator name.

The CPU stores, in the job storing area of the RAM, job data in which the document creator name received in Step S101 and data corresponding to the executed processing (that is, printing in this case) and a date of the execution are associated with each other. Accordingly, another equipment can detect, in accordance with the job data (or history data), the name of a person having executed the processing, the executed processing and the date of the execution of the processing as described later.

Furthermore, in the case where a gradation QR code is not added, at the time of creating the document, to the image data to be processed, the content of the processing associated in the job data may be "creating".

Next, the CPU matches the name and the password of the document creator received in Step S101 on the basis of the data stored in the storage unit 300 (Step S104). When the name and the password of the document creator accord with those stored in the storage unit 300, the CPU encrypts the document creator name by instructing the encryption section 402 of the code creation section 410 (Step S105). In response to the instruction of the CPU, the encryption section 402 obtains a secret key of the document creator name (the user name) from the storage unit 300, and encrypts the document creator name (second data) by using the secret key.

On the other hand, when the name and the password of the document creator do not accord with those stored in the storage unit 300, the CPU displays, on the display section 501, an input screen including a text that the name and the password of the document creator do not accord for urging to input the name and the password of the document creator again.

It is noted that a secret key may be inputted through the control panel 500 at the time of creating the document by the document creator. In this case, processing for determining whether or not an inputted secret key and the name (or the password) of the document creator accord on the basis of the data stored in the storage unit 300 may be performed.

Thereafter, the CPU reads the job data from the job storing area of the RAM and obtains the read job data (Step S106). Next, the CPU generates image data of a micro gradation (a gradation pattern) on the basis of the document creator name encrypted by the encryption section 402 in Step S105 and the job data obtained in Step S105 (Step S107). This procedure is executed by the CPU instructing the micro gradation generation section 403 to generate image data of a micro gradation on the basis of the encrypted name of the document creator and the job data. The description of the generation of image data of a micro gradation executed by the micro gradation generation section 403 has been already described and hence omitted. Through the aforementioned procedure, micro gradations based on the encrypted second data and the job data are respectively expressed in the second data area and the history data area of the QR code based on the first data, and thus, the image data of the gradation QR code (additional image data) is generated.

Next, the CPU instructs the print position specification section 404 to specify a position for printing the gradation QR code on recording paper (Step S108). For example, in the digital multi-function peripheral 1 of Embodiment 1, the gradation QR code is printed at a right end of a header in accordance with a prescribed program.

The CPU adds the image data of the gradation QR code to the edited image data in accordance with the specified print position (Step S109). As a result, when an image based on the edited image data is printed, the gradation QR code is printed in the specified print position on the recording paper. Through this processing, output image data is generated.

Figure 10:
FIG. 10 is an exemplary diagram illustrating an example of a document printed by an image output apparatus of Embodiment 1.

Next, the CPU prints an image based on the output image data by instructing the image output apparatus 700 (Step S110). In response to the instruction of the CPU, the image output apparatus 700 prints the image based on the output image data. In the image (document) printed by the image output apparatus 700, the gradation QR code is printed at the right end of the header. FIG. 10 is an exemplary diagram illustrating an example of a document printed by the image output apparatus 700 of Embodiment 1.

Embodiment 2

Figure 11:
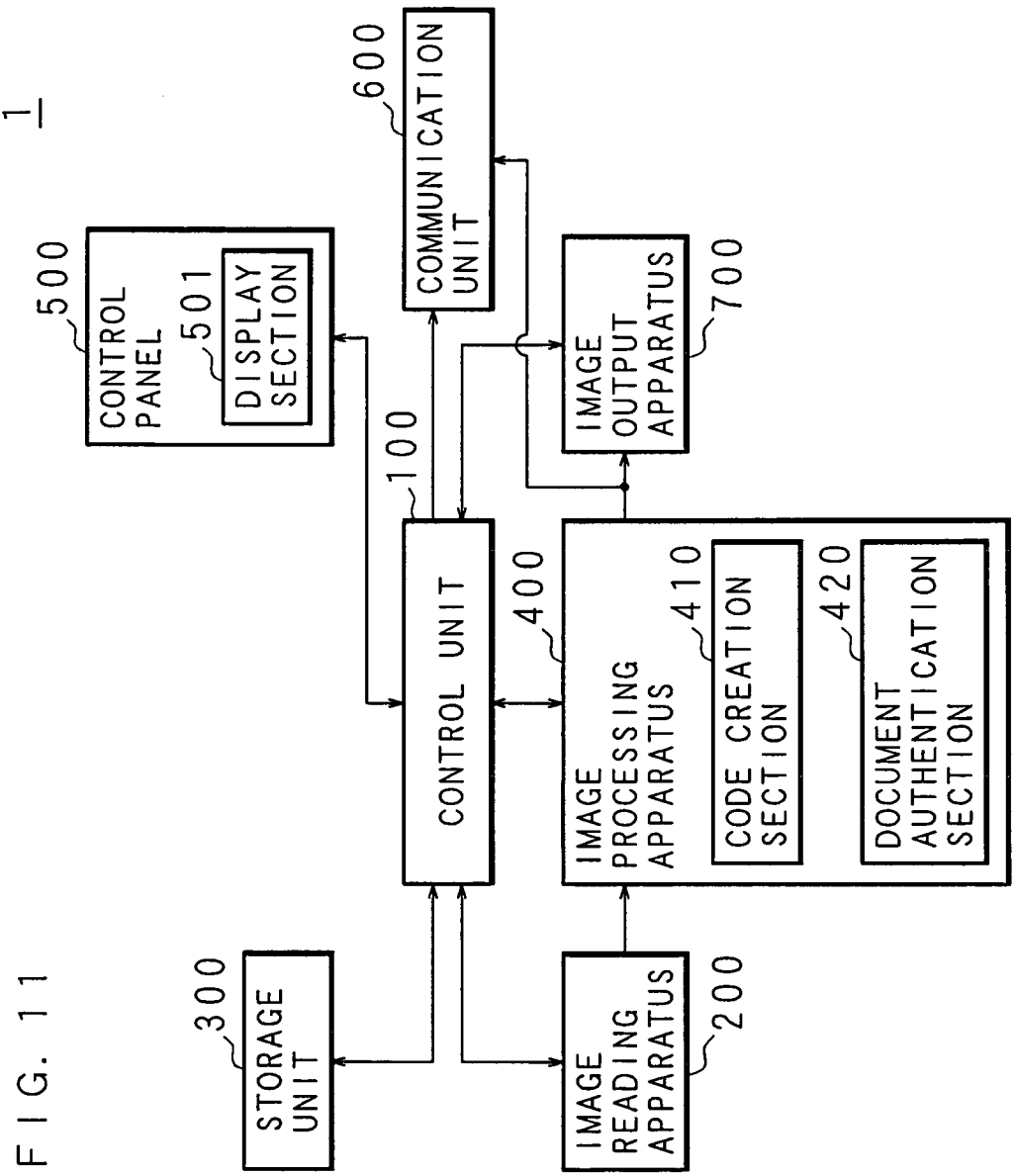
FIG. 11 is a block diagram illustrating a principal configuration of a digital multi-function peripheral according to Embodiment 2.

FIG. 11 is a block diagram illustrating a principal configuration of a digital multi-function peripheral 1 according to Embodiment 2. The digital multi-function peripheral 1 of Embodiment 2 includes, similarly to the digital multi-function peripheral 1 of Embodiment 1, hardware such as a control unit 100, an image reading apparatus 200, an image processing apparatus 400, an image output apparatus 700, a storage unit 300, a communication unit 600 and an control panel 500. The image processing apparatus 400 of the digital multi-function peripheral 1 of Embodiment 2 includes, in addition to a code creation section 410, a document authentication section 420.

Figure 12:
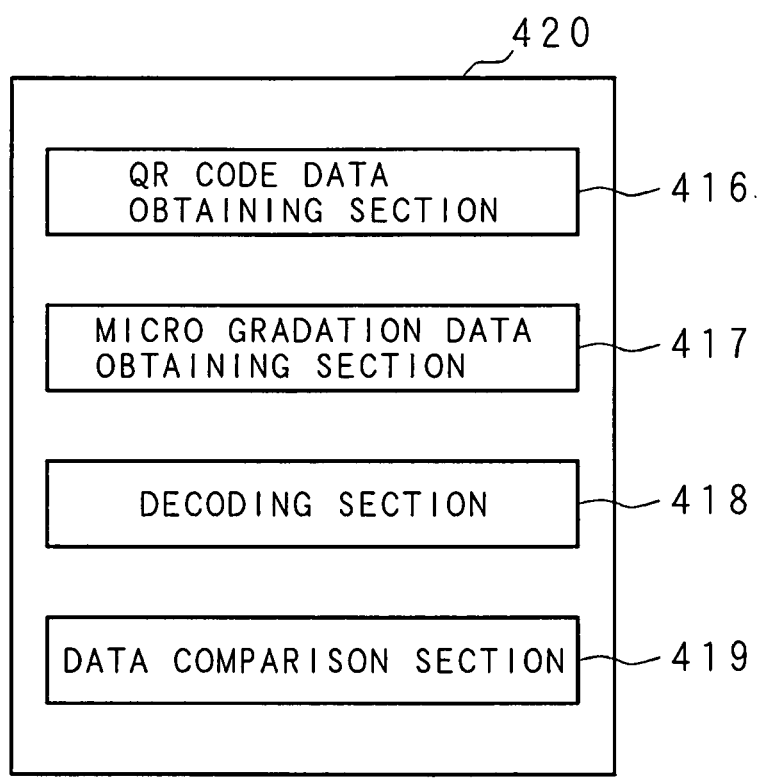
FIG. 12 is a block diagram illustrating a principal configuration of a document authentication section included in an image processing apparatus of the digital multi-function peripheral of Embodiment 2.

FIG. 12 is a block diagram illustrating a principal configuration of the document authentication section 420 included in the image processing apparatus 400 of the digital multi-function peripheral 1 of Embodiment 2. The document authentication section 420 includes a QR code data obtaining section 416, a micro gradation data obtaining section 417, a decoding section 418 and a data comparison section 419.

The QR code data obtaining section 416 extracts (separates), from image data of a QR code included in image data of a document read by the image reading apparatus 200, first data expressed with a QR code (hereinafter referred to as the QR code data). The QR code data obtaining section 416 specifies the position of the QR code on the basis of cut-out symbols of the QR code, and extracts and obtains the QR code data.

The micro gradation data obtaining section 417 extracts and obtains data based on micro gradations respectively expressed in a second data area and a history data area (i.e., encrypted second data and history data), for example, from the image data of the QR code included in the image data of the document read by the image reading apparatus 200.

The decoding section 418 decodes the encrypted second data obtained by the micro gradation data obtaining section 417 by using a prescribed public key (or a decoding key).

The data comparison section 419 compares (matches), for example, first data and second data with each other. The first data corresponds to the QR code data obtained by the QR code data obtaining section 416. The second data corresponds to data obtained by decoding, by the decoding section 418, the encrypted second data obtained by the micro gradation data obtaining section 417.

Now, description will be given on a case where a document (image data) including a gradation QR code printed by the digital multi-function peripheral 1 of Embodiment 1 is handled by the digital multi-function peripheral 1 of Embodiment 2. More specifically, prescribed processing to be executed on the document and processing for updating history data to be executed during the execution of the processing of the document will be described. For convenience, it is assumed in the following description that a document printed by the digital multi-function peripheral 1 of Embodiment 1 is copied by a prescribed user. It is also assumed that a second data area and a history data area expressing micro gradations respectively based on encrypted second data and history data are precedently defined as a format in a gradation QR code.

Furthermore, in the gradation QR code added to the document, QR code data (first data) is data corresponding to a document creator name, and second data and history data expressed with micro gradations respectively correspond to the document creator name the same as the first data and accumulated data of history. Incidentally, the storage unit 300 stores, in the same manner as in Embodiment 1, data in which a user name, a password of each user, a secret key (and a public key) of each user are associated with one another.

Figure 13:
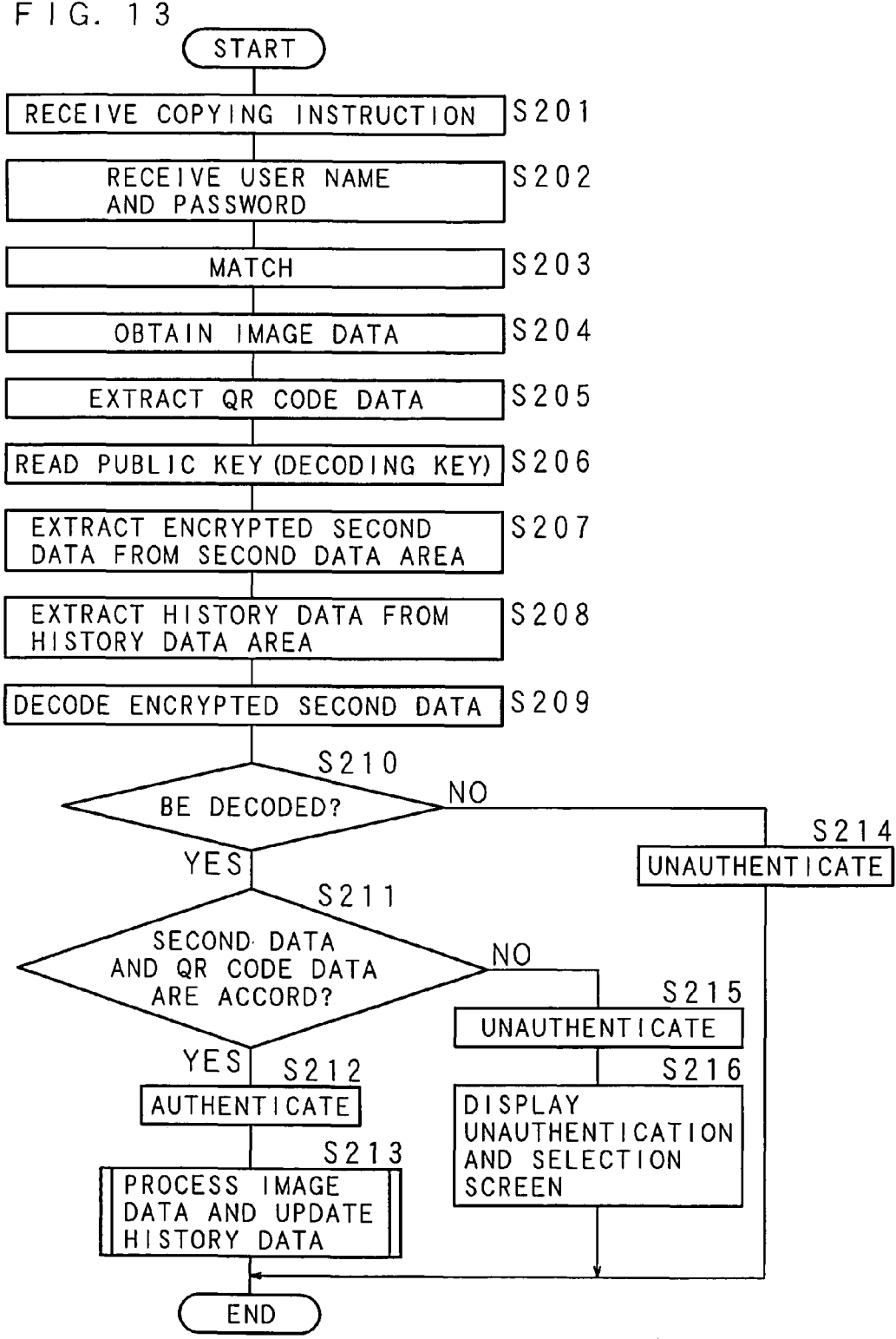
FIG. 13 is a flowchart of copying processing executed by the digital multi-function peripheral of Embodiment 2 on a document to which a gradation QR code has been added.

FIG. 13 is a flowchart of copying processing executed by the digital multi-function peripheral 1 of Embodiment 2 on a document to which a gradation QR code has been added.

A user desiring to copy the document to which the gradation QR code has been added places the document on a scanner platen and instructs copying of the document by operating the control panel 500.

The CPU of the control unit 100 receives the copying instruction from the user through the control panel 500 (Step S201). When the instruction is received from the user, the CPU displays, on the display section 501, an input screen for urging to input a user name and a password by using a program stored in the storage unit 300. When the user inputs the user name and the password by operating the control panel 500, the CPU receives the user name and the password through the control panel 500 (Step S202).

When the user name and the password are received, the CPU matches the user name and the password on the basis of data precedently stored in the storage unit 300 (Step S203). When the user name and the password accord with the stored data, the CPU instructs the image reading apparatus 200 to read an image of the document so as to obtain image data of the document (Step S204).

On the other hand, when the user name and the password do not accord with the stored data, the CPU displays, on the display section 501, a text that the user name and the password do not accord and an input screen for urging to input the user name and the password again.

At this point, the CPU stores, in the job storing area of the RAM, job data in which the user name received in Step S202 and data corresponding to the executed processing (that is, copying in this case) and the date of the execution are associated with one another.

Next, the CPU instructs the QR code data obtaining section 416 to extract (separate) QR code data from the image data of the document (Step S205). In response to the instruction of the CPU, the QR code data obtaining section 416 specifies a position where the QR code is printed on the basis of cut-out symbols of the QR code, so as to extract the QR code data from the image data of the document. Through this procedure, the QR code data obtaining section 416 obtains a document creator name (first data).

Thereafter, the CPU reads a public key (a decoding key) to be used for decoding encrypted second data from data stored in the storage unit 300 on the basis of the document creator name (first data) (Step S206). The method for obtaining the public key is not limited to this method but the public key may be obtained by receiving it from the user through the control panel 500. The obtained public key is temporarily stored in the RAM of the control unit 100.

Next, the CPU instructs the micro gradation data obtaining section 417 to extract (separate) data of a micro gradation expressed in a second data area of the QR code (i.e., the encrypted second data) (Step S207). The micro gradation data obtaining section 417 specifies the position where the QR code is printed on the basis of the cut-out symbols of the QR code, so as to extract the encrypted second data. In response to the instruction of the CPU, the micro gradation data obtaining section 417 obtains the encrypted second data.

In this case, since the micro gradation based on the encrypted second data is expressed in cells of the QR code based on the first data, the position where the second data is added is easily visually known. For example, when the data of the micro gradation (i.e., the second data) is to be read by using a camera function of a cellular phone, the camera of the cellular phone can easily grasp the position of the data that is impossible to be distinguished from a design of the page background with naked eyes.

Furthermore, the CPU instructs the micro gradation data obtaining section 417 to extract (separate) history data of a micro gradation expressed in a history data area of the QR code (Step S208). The micro gradation data obtaining section 417 specifies the position where the QR code is printed on the basis of the cut-out symbols of the QR code, so as to extract the history data. In response to the instruction of the CPU, the micro gradation data obtaining section 417 obtains the history data (i.e., history data not updated yet).

Moreover, the CPU instructs the decoding section 418 to decode the encrypted second data obtained in Step S207 (Step S209). In response to the instruction of the CPU, the decoding section 418 reads the public key stored in the RAM of the control unit 100 and decodes the encrypted second data by using the public key.

Next, the CPU determines whether or not the encrypted second data has been decoded by the decoding section 418 (Step S210). When it is determined that the encrypted second data has not been decoded by the decoding section 418 (Step S210: NO), the CPU unauthenticates the document (the image data) placed on the scanner platen as an unreliable document (Step S214).

On the other hand, when it is determined that the encrypted second data has been decoded by the decoding section 418 (Step S210: YES), the CPU instructs the data comparison section 419 to compare the second data having been decoded by the decoding section 418 with the QR code data (the first data) obtained in Step S205. Incidentally, the CPU determines whether or not the second data and the QR code data (the first data) accord with each other in accordance with the comparison result obtained by the data comparison section 419 (Step S211).

When it is determined that the second data and the QR code data do not accord with each other (Step S211: NO), the CPU unauthenticates the document (the image data) as an unreliable document (Step S215). In this case, the CPU informs the result of the determination, namely, the discordance of the second data and the QR code data and displays, on the display section 501 of the control panel 500, a selection screen for receiving selection whether or not the processing is to be continued (Step S216).

Thereafter, the CPU may cancel the copying instruction received in Step S201, discard the image data, inform the creator of the document including the QR code through the communication unit 600, or the like. In this manner, damage such as forgery of a document by a malicious third party can be prevented.

When it is determined that the second data and the QR code data accord with each other (Step S211: YES), the CPU authenticates the document (the image data) as a reliable document (Step S212). In this case, the CPU executes the processing (copying in this case) of the image data corresponding to the instruction received in Step S201 and updates the history data (Step S213). The processing of the image data and the processing of updating the history data correspond to procedures executed in steps S301 through S308 described later.

Figure 14:
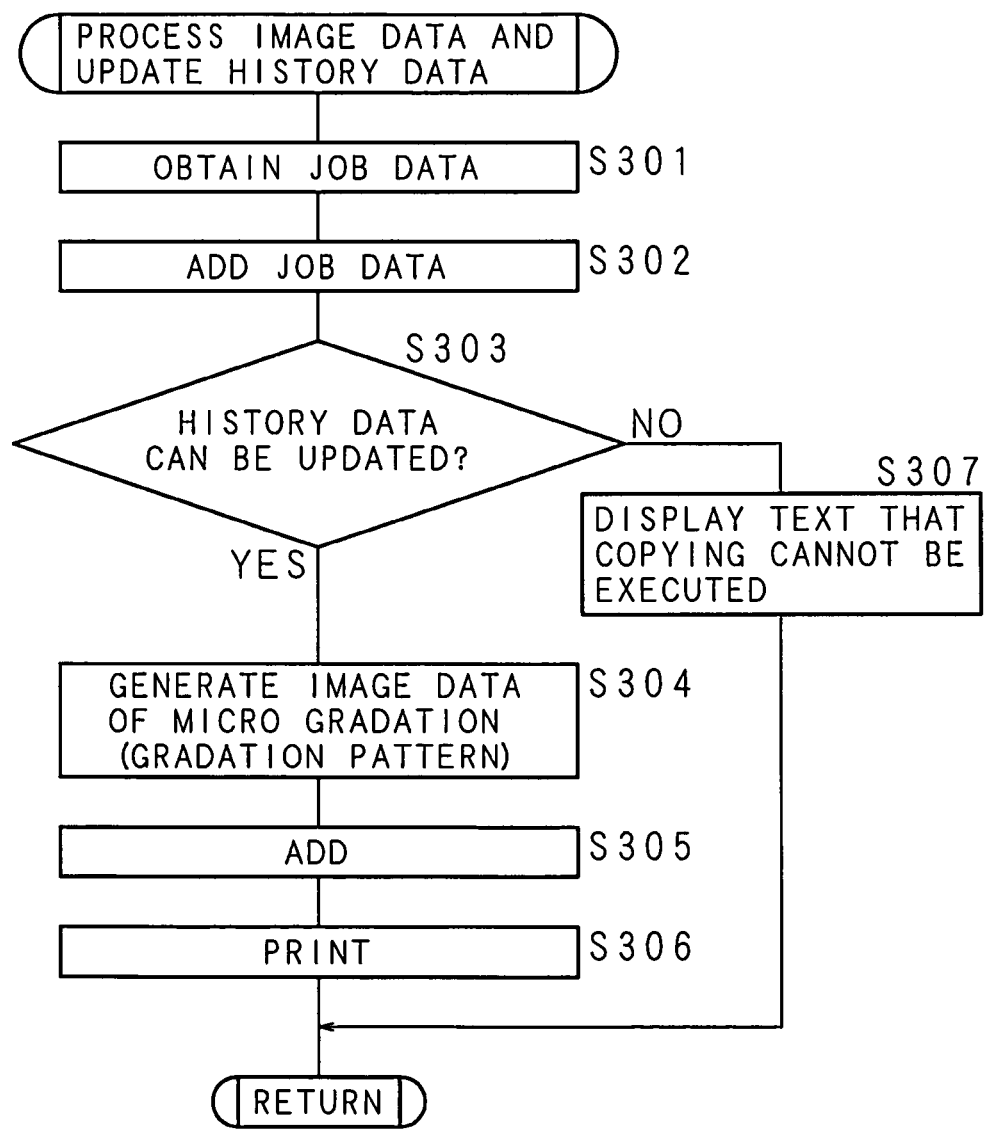
FIG. 14 is a flowchart of processing of image data and processing of updating history data executed by a CPU (Central Processing Unit) of the digital multi-function peripheral of Embodiment 2.

FIG. 14 is a flowchart of the processing of the image data and the processing of updating the history data executed by the CPU of the digital multi-function peripheral 1 of Embodiment 2. For convenience, it is exemplarily assumed that the document received in Step S201 is copied after executing the procedure of Step S212.

Before copying the document, the CPU reads the job data stored in the job storing area of the RAM so as to obtain the job data (Step S301). In the job data, the user name and the data corresponding to the executed processing (copying in this case) and the date of the execution are associated with each other.

Next, the CPU adds the job data to the history data extracted in Step S208 (Step S302). Thereafter, the CPU determines whether or not the history data expressed as the micro gradation in the history data area can be updated in the QR code printed in the document (Step S303).

This determination will be described in detail. The total capacity that can be accommodated in a history data area of a QR code printed in a document is limited as described above. Therefore, the CPU determines whether or not a micro gradation based on updated history data can be expressed in a history data area by comparing the capacity of the updated history data with the total capacity of the history data area. When it is determined that the micro gradation based on the updated history data can be expressed in the history data area, the CPU determines that the history data can be updated. On the other hand, when the micro gradation based on the updated history data cannot be expressed in the history data area, the CPU determines that the history data cannot be updated.

It is noted that the determination method is not limited to that described above. A data capacity that can be added is calculated on the basis of the total capacity of the history data area and the capacity of the history data not updated yet. Then, the calculated data capacity may be compared with the capacity of the job data, so as to determine whether or not the history data can be updated.

When it is determined that the history data can be updated (Step S303: YES), the CPU instructs the micro gradation generation section 403 to generate image data of a micro gradation (a gradation pattern) based on the updated history data (Step S304).

More specifically, the micro gradation generation section 403 generates a QR code on the basis of the first data, and generates a micro gradation on the basis of the second data and the updated history data. The micro gradation generation section 403 adds the micro gradation to the QR code, so as to generate image data (updated additional image data) of a gradation QR code. The QR code data (the first data) and the second data are the same as those read from the document.

The CPU adds, to the image data obtained in Step S204, the image data of the gradation QR code generated in Step S304 instead of the image data of the existing gradation QR code (Step S305). In this manner, the gradation QR code in which the history data has been updated is added, resulting in generating output image data.

Next, the CPU instructs the image output apparatus 700 to print an image based on the output image data on recording paper (Step S306). In response to the instruction of the CPU, the image output apparatus 700 prints the image based on the output image data.

As described above, a QR code based on a document creator name (first data) is generated and micro gradations respectively based on second data and history data are added to the generated QR code, and therefore, a highly reliable document can be created with minimizing an area occupied by the gradation QR code.

On the other hand, when it is determined in Step S303 that the history data cannot be updated (Step S303: NO), the CPU displays, on the display section 501, a text that the processing of the image data corresponding to the received instruction, namely, the copying, cannot be executed (Step S307). The CPU terminates the processing in Step S307.

Incidentally, every time processing (such as copy, transmission of an e-mail, transmission of a facsimile or edition) of a document (image data) is executed, job data of the processing is added, so as to update history data. Accordingly, even after a plurality of processing have been executed, the history of the processing having been executed on the document can be appropriately checked.

Like reference numerals are used to refer to like elements used in Embodiment 1 so as to omit the detailed description.

Embodiment 3

A digital multi-function peripheral 1 according to Embodiment 3 has a similar configuration to the image forming apparatus of Embodiment 1 or 2 and is characterized by processing executed by an encryption section 402 of a code creation section 410. More specifically, the encryption section 402 of the digital multi-function peripheral 1 of Embodiment 3 encrypts not only a document creator name but also data for restricting usage of a document to be printed (or image data of the document). For example, in the case where a creator of a document desires to specify a person for allowing/prohibiting usage of the document, data for specifying the person is encrypted by the encryption section 402. On the basis of the data encrypted by the encryption section 402, a micro gradation generation section 403 generates image data of a micro gradation (a gradation pattern). In the following description, it is assumed for convenience that data (such as a name or an ID code) for specifying a person for allowing copying of a document (hereinafter designated as a copying allowed person) is encrypted by the encryption section 402.

The encryption section 402 of the digital multi-function peripheral 1 of Embodiment 3 encrypts, by using a secret key of a document creator, data for specifying a copying allowed person. Specifically, in a document printed by the digital multi-function peripheral 1 of Embodiment 3, a micro gradation based on data for specifying a copying allowed person is expressed in a QR code based on a document creator name. A document thus restricted in copying by the digital multi-function peripheral 1 of Embodiment 3 is hereinafter designated as a copying restricted document.

On the other hand, when a copying restricted document is to be copied, the digital multi-function peripheral 1 of Embodiment 3 copies the copying restricted document on the basis of micro gradation data corresponding to a copying allowed person.

Figure 15:
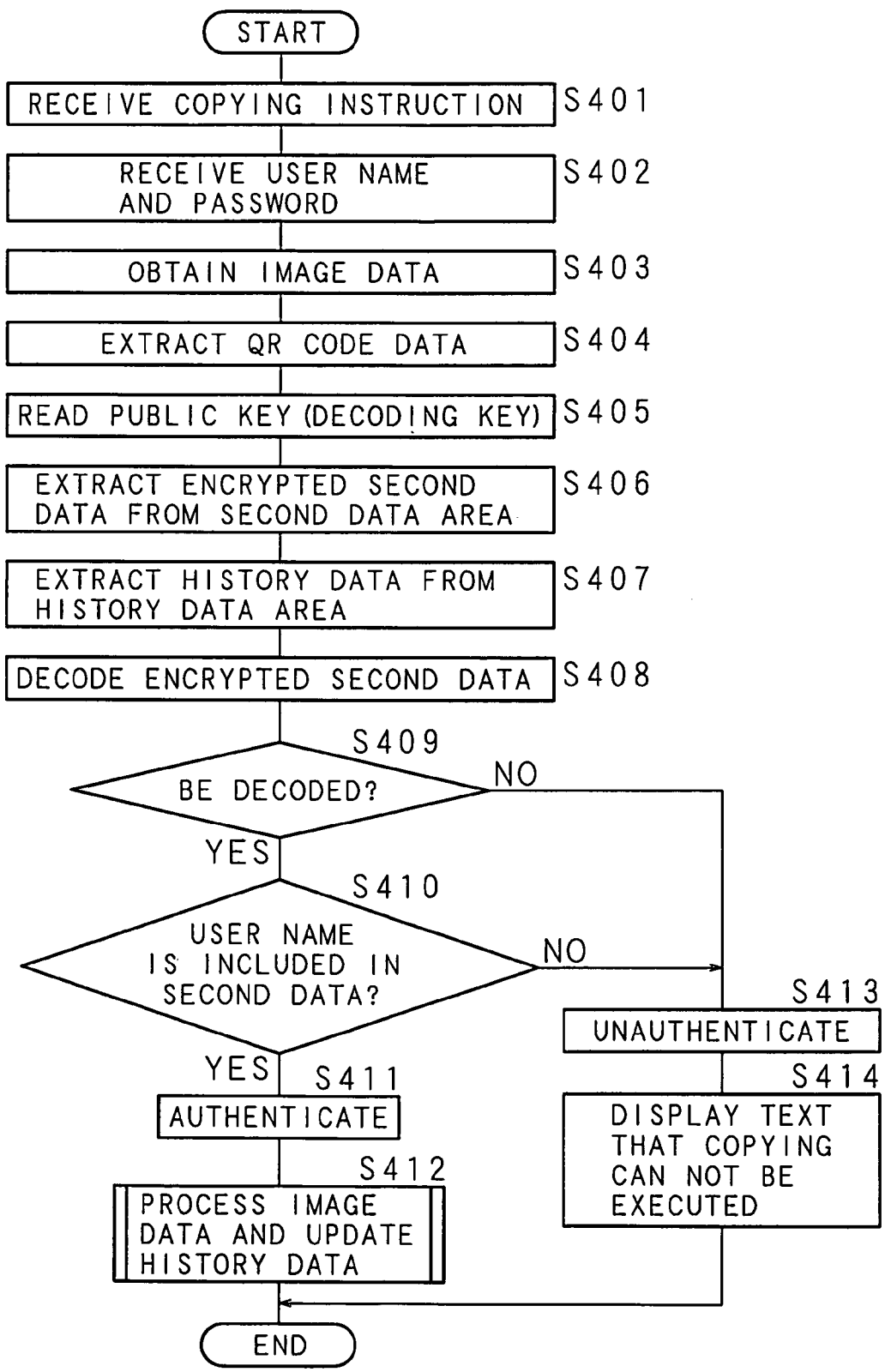
FIG. 15 is a flowchart of exemplary copying processing executed by the digital multi-function peripheral on a copying restricted document.

Now, copying of a copying restricted document by the digital multi-function peripheral 1 of Embodiment 3 will be described. FIG. 15 is a flowchart of exemplary copying processing executed by the digital multi-function peripheral 1 on a copying restricted document. It is exemplarily assumed for convenience that a prescribed copying executor copies a copying restricted document. A gradation QR code is added to the copying restricted document. A QR code of the gradation QR code is generated on the basis of a document creator name (first data) and a micro gradation expressed in the QR code is generated on the basis of a copying allowed person (second data). A storage unit 300 stores, in the same manner as in Embodiment 1 or 2, data in which a user name, a password of each user and a secret key (and a public key) of each user are associated with one another. Furthermore, a second data area and a history data area are precedently defined as a format in cells of the gradation QR code in the same manner as in Embodiment 1 or 2.

A user desiring to copy the copying restricted document places the document on a scanner platen and instructs copying of the document by operating a control panel 500.

A CPU of a control unit 100 receives the copying instruction from the user through the control panel 500 (Step S401). When the copying instruction is received from the user, the CPU displays, on a display section 501, an input screen for urging to input a user name and a password by using a program stored in the storage unit 300. In response to the display, the user inputs the user name and the password by operating the control panel 500. The CPU receives the user name and the password (third data) from the user through the control panel 500 (Step S402).

At this point, the CPU stores, in a job storing area of a RAM, job data in which the user name received in Step S402 and data corresponding to the executed processing (copying in this case) and the date of the execution are associated with each other.

Next, the CPU instructs an image reading apparatus 200 to read an image of the document, so as to obtain image data of the document (Step S403).

The CPU instructs a QR code data obtaining section 416 to extract (separate) QR code data from the image data of the document (Step S404). In response to the instruction of the CPU, the QR code data obtaining section 416 specifies the position of a gradation QR code on the basis of cut-out symbols of the gradation QR code. Thereafter, the QR code data obtaining section 416 extracts the QR code data from the image data of the document, so as to obtain a document creator name (first data).

The CPU reads, on the basis of the document creator name extracted from the QR code, a public key (a decoding key) of the document creator to be used for decoding encrypted second data from data stored in the storage unit 300 (Step S405). The method for reading the public key is not limited to this. The public key may be received from the user through the control panel 500. The obtained public key is temporarily stored in a RAM of the control unit 100.

Thereafter, the CPU instructs a micro gradation data obtaining section 417 to extract (separate) data of a micro gradation expressed in a second data area of the gradation QR code (namely, encrypted second data) (Step S406). The micro gradation data obtaining section 417 specifies the position of the QR code on the basis of the cut-out symbols of the QR code, so as to extract the encrypted second data. In response to the instruction of the CPU, the micro gradation data obtaining section 417 extracts the encrypted second data, so as to obtain the encrypted second data.

In this case, the micro gradation based on the encrypted second data is expressed in the QR code based on the first data. Accordingly, the position where the second data is added can be easily visually known.

Furthermore, the CPU instructs the micro gradation data obtaining section 417 to extract (separate) history data of a micro gradation expressed in a history data area of the gradation QR code (Step S407). The micro gradation data obtaining section 417 specifies the position of the gradation QR code on the basis of the cut-out symbols of the gradation QR code, so as to extract the history data. In response to the instruction of the CPU, the micro gradation data obtaining section 417 extracts the history data, so as to obtain the history data (history data not updated yet).

Furthermore, the CPU instructs a decoding section 418 to decode the encrypted second data obtained in Step S406 (Step S408). In response to the instruction of the CPU, the decoding section 418 reads the public key of the document creator stored in the RAM of the control unit 100 and decodes the encrypted second data by using the public key.

Next, the CPU determines whether or not the encrypted second data has been decoded by the decoding section 418 (Step S409). When it is determined that the encrypted second data has not been decoded by the decoding section 418 (Step S409: NO), the CPU unauthenticates the document (the image data) as an unreliable document (Step S413). In this case, the CPU displays, on the display section 501 of the control panel 500, a text that the document cannot be copied (Step S414).

Thereafter, the CPU may cancel the copying instruction received in Step S401, discard the image data of the copying restricted document, inform the creator of the document including the QR code through the communication unit 600, or the like. In this manner, usage of the copying restricted document by a person other than specified persons desired by the creator of the copying restricted document can be restricted.

On the other hand, when it is determined that the encrypted second data has been decoded by the decoding section 418 (Step S409: YES), the CPU instructs a data comparison section 419 to compare the second data having been decoded by the decoding section 418 with the user name (the third data) received in Step S402. Specifically, the CPU determines whether or not the user name (the third data) is included in names of copying allowed persons stored in the second data (Step S410).

When it is determined that the user name is not included in the names of copying allowed persons (the second data) (Step S410: NO), the CPU unauthenticates the user as an unreliable user (Step S413). In this case, the CPU displays, on the display section 501 of the control panel 500, a text that the copying restricted document cannot be copied (Step S414).

On the other hand, when it is determined that the user name is included in the names of the copying allowed persons (the second data) (Step S410: YES), the CPU authenticates the user as a reliable user (Step S411), and processes the image data in accordance with the instruction received in Step S401 (copies an image based on the image data in this case), and updates the history data (Step S412). The processing of the image data and the processing of updating the history data are the same as procedures executed in steps S301 through 308 described above and hence the detailed description is omitted.

In the above description, the second data is matched with the received data (the third data) from outside, so as to execute the processing in accordance with the instruction received in Step S401 in accordance with the result of the match. However, the method for restricting the processing in the digital multi-function peripheral 1 of Embodiment 3 is not limited to this. For example, in the case where a QR code is generated as first data based on a name of a copying allowed person and a document creator name, the first data may be matched with received data (third data) from outside, so as to execute the received processing in accordance with the result of this match.

Embodiment 4

Figure 16:
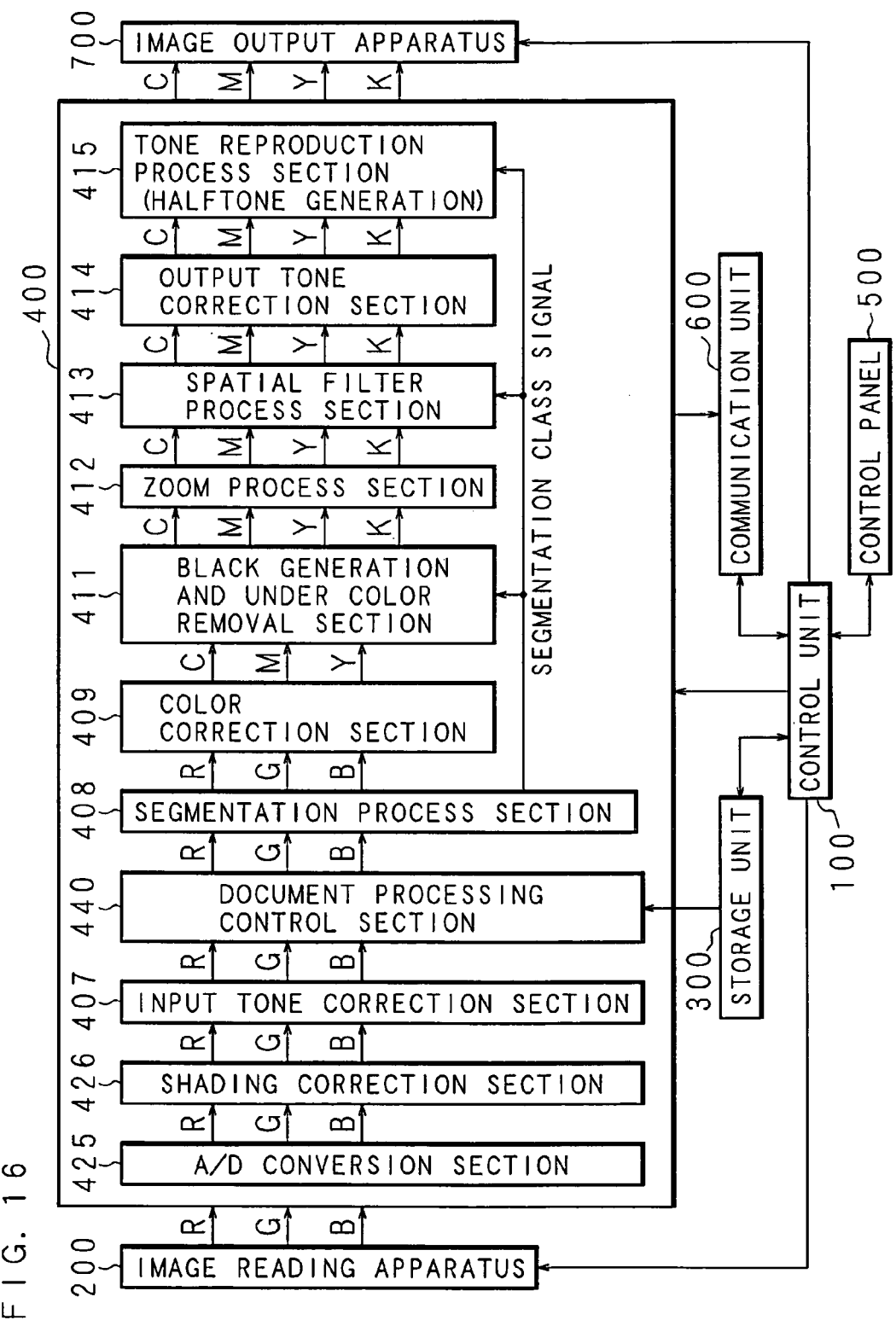
FIG. 16 is a block diagram illustrating a principal configuration of a digital multi-function peripheral according to Embodiment 4.
Figure 17:
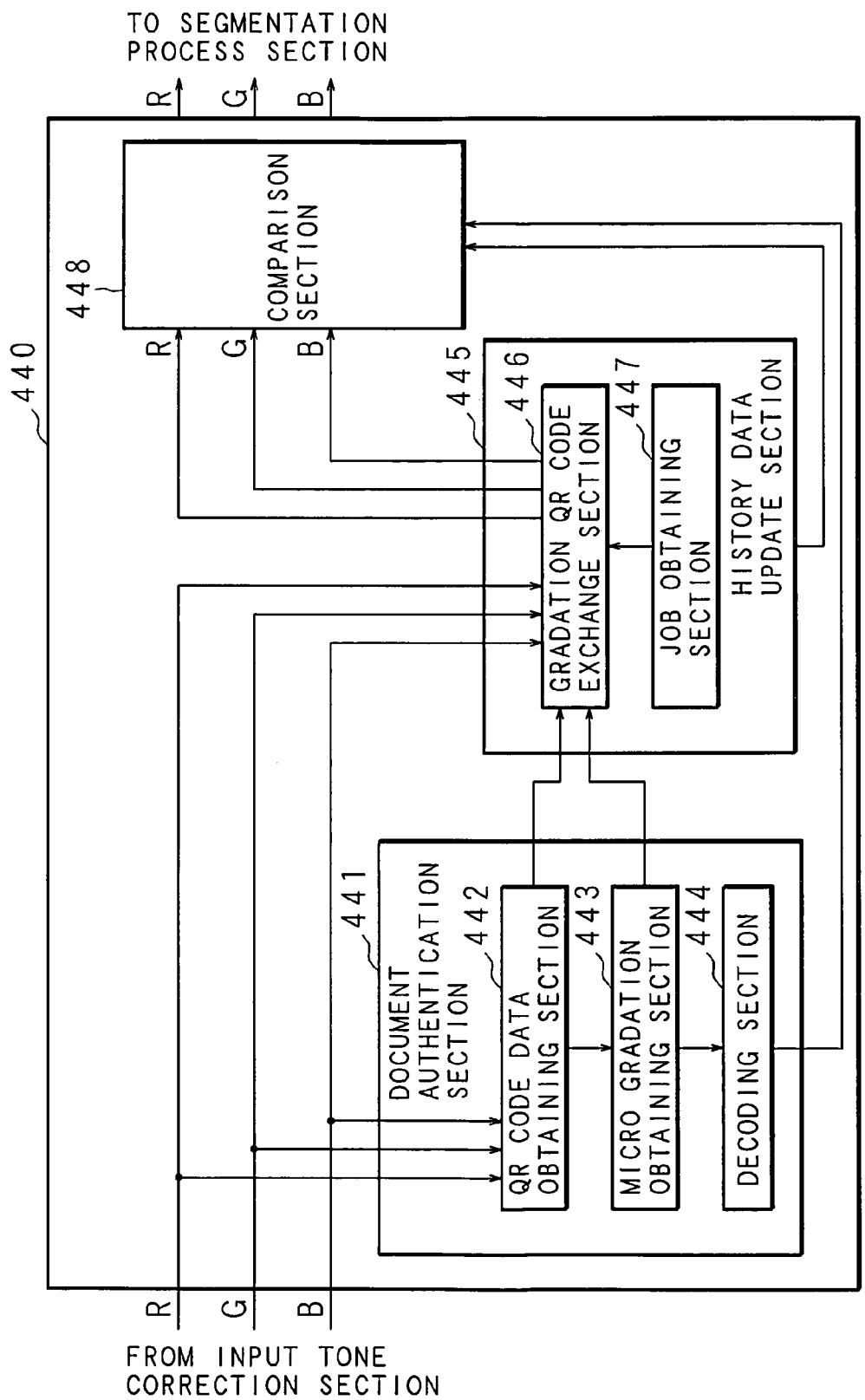
FIG. 17 is a block diagram illustrating a principal configuration of a document processing control section included in the digital multi-function peripheral of Embodiment 4.

FIG. 16 is a block diagram illustrating a principal configuration of a digital multi-function peripheral 1 according to Embodiment 4. FIG. 17 is a block diagram illustrating a principal configuration of a document processing control section 440 included in the digital multi-function peripheral 1 of Embodiment 4.

The digital multi-function peripheral 1 of Embodiment 4 includes, similarly to the image forming apparatus of Embodiment 2 or 3, hardware such as a control unit 100, an image reading apparatus 200, an image processing apparatus 400, an image output apparatus 700, a storage unit 300, a communication unit 600 and a control panel 500. The storage unit 300 stores, in the same manner as in Embodiment 2, data in which a user name, a password of each user, a secret key (and a public key) of each user and the like are associated with one another.

Furthermore, in the digital multi-function peripheral 1 of Embodiment 4, a gradation QR code is added to, for example, image data read by the image reading apparatus 200. When the gradation QR code includes history data, the digital multi-function peripheral 1 of Embodiment 4 can output an image based on the history data in the form of display, transmission, attachment to an e-mail or the like.

The image processing apparatus 400 includes an A/D (Analog/Digital) conversion section 425, a shading correction section 426, an input tone correction section 407, the document processing control section 440, a segmentation process section 408, a color correction section 409, a black generation and under color removal section 411, a zoom process section 412, a spatial filter process section 413, an output tone correction section 414, and a tone reproduction process section 415. Furthermore, the image processing apparatus 400 is connected to the image reading apparatus 200 and the image output apparatus 700.

Analog signals of image data read by the image reading apparatus 200 are transmitted, in the image processing apparatus 400, in the order of the A/D conversion section 425, the shading correction section 426, the input tone correction section 407, the document processing control section 440, the segmentation process section 408, the color correction section 409, the black generation and under color removal section 411, the zoom process section 412, the spatial filter process section 413, the output tone correction section 414 and the tone reproduction process section 415. Thereafter, the analog signals are outputted to the image output apparatus 700 as CMYK digital color signals.

Now, processing executed by these sections will be described in detail by exemplarily assuming that image data to which a gradation QR code has been added is used. In the gradation QR code, a micro gradation based on history data of processing of the image data is expressed in a QR code.

The A/D conversion section 425 converts analog RGB signals received from the image reading apparatus 200 into digital RGB signals. The shading correction section 426 removes, from the digital RGB signals outputted from the A/D conversion section 425, various distortion caused during processing executed by the image reading apparatus 200 such as illumination, image focusing and image sensing.

The input tone correction section 407 adjusts color balance of the RGB signals from which the various distortion has been removed by the shading correction section 426 (i.e., RGB reflectance signals) and converts the adjusted RGB signals into density signals.

It is noted that the document processing control section 440 of the image forming apparatus of Embodiment 4 includes a document authentication section 441, a history data update section 445 and a comparison section 448.

Furthermore, the document authentication section 441 includes a QR code data obtaining section 442, a micro gradation data obtaining section 443 and a decoding section 444. Also, the history data update section 445 includes a gradation QR code exchange section 446 and a job obtaining section 447.

The QR code data obtaining section 442 specifies the position of the gradation QR code on the basis of cut-out symbols of the gradation QR code, and obtains (extracts) QR code data from image data of the gradation QR code included in image data of a document read by the image reading apparatus 200.

The micro gradation data obtaining section 443 obtains encrypted second data and history data based on micro gradations respectively expressed in a second data area and a history data area from, for example, the image data of the gradation QR code included in the image data of the document read by the image reading apparatus 200.

The decoding section 444 decodes the encrypted second data obtained by the micro gradation data obtaining section 443 by using a prescribed public key (or a decoding key).

The job obtaining section 447 obtains job data and sends it to the gradation QR code exchange section 446. The job data is data in which data for specifying a user is associated with the executed processing (such as copying, printing or transmission of a facsimile), the date of the execution, a serial number of the corresponding apparatus and the like. The data for specifying a user is received through, for example, the control panel 500.

The gradation QR code exchange section 446 generates image data of a gradation QR code (updated additional image data) and adds the generated image data to the image data read by the image reading apparatus 200. QR code data expressed with a QR code in the gradation QR code is sent from the QR code data obtaining section 442. The second data and the history data (updated history data) expressed with micro gradations are respectively the second data having been decoded by the decoding section 444 and history data to which the job data has been newly added (updated history data).

The comparison section 448 compares (matches) the QR code data (first data), the second data and received data (third data) from outside with one another. The QR code data is obtained by the QR code data obtaining section 442. The second data is obtained by the micro gradation data obtaining section 443 and is decoded by the decoding section 444. A CPU of the control unit 100 executes, for example, subsequent processing in accordance with the comparison result obtained by the comparison section 448.

The segmentation process section 408 receives the RGB signals and separates respective pixels of the inputted image into a text region, a halftone region and a photograph region. Also, the segmentation process section 408 outputs, in accordance with the result of the separation, a segmentation class signal representing which region each pixel corresponds to to the black generation and under color removal section 411, the spatial filter process section 413 and the tone reproduction process section 415. Furthermore, the segmentation process section 408 outputs the input signal outputted from the input tone correction section 407 directly to the color correction section 409 described later.

The color correction section 409 removes color impurity, for reproducing colors with fidelity, on the basis of the spectral characteristics of color materials of CMY (C: cyan, M: magenta and y: yellow) including unnecessary absorbed components.

The black generation and under color removal section 411 generates black (K) signals on the basis of signals of the three colors of CMY resulting from the color correction and generates new CMY signals by subtracting the K signals from the original CMY signals. Thus, the CMY three-color signals are converted into CMYK four-color signals.

An example of a method for generating a black (K) signal is a black (K) signal generation method using skeleton black (a general method). In this method, assuming that the input/output characteristic of a skeleton curve is $y=f(x)$, that inputted data are C, M and Y, that outputted data are C', M', Y' and K', and that a UCR (Under Color Removal) ratio is a $(0<\alpha<1)$, a black generation and under color removal process is expressed by the following expressions: $K'=f\{min(C, M, Y)\}$, $C'=C-\alpha K'$, $M'=M-\alpha K'$ and $Y'=Y-\alpha K'$.

The zoom process section 412 executes scaling or the like of the image on the basis of a signal inputted by operating the control panel 500 included in the image forming apparatus.

The spatial filter process section 413 executes a spatial filtering process using a digital filter on the image data of the CMYK signals inputted from the black generation and under color removal section 411 in accordance with the segmentation class signals. The spatial filter process section 413 prevents blur and graininess degradation of an output image by correcting a spatial frequency characteristic. Also the tone reproduction process section 415 executes a prescribed process on the image data of the CMYK signals in accordance with the segmentation class signals similarly to the spatial filter process section 413.

For example, in a region separated as a text region by the segmentation process section 408, a high frequency component is sharpened through an edge enhancement process executed in the spatial filtering process of the spatial filter process section 413 so as to improve the reproducibility of a color text and a black text in particular. Simultaneously, the tone reproduction process section 415 selects a binarizing process or a multi-level dithering process suitable to reproduction of a high frequency in a screen with high resolution and executes the selected process.

Alternatively, in a region separated as a halftone region by the segmentation process section 408, the spatial filter process section 413 executes a low-pass filtering process for removing an inputted halftone component.

Then, the output tone correction section 414 executes an output tone correction process on the basis of the output characteristic of a color image output apparatus. Thereafter, in the tone reproduction process section 415, the image is ultimately separated into pixels, and a tone reproduction process (halftone generation) is executed so as to reproduce the tone of each pixel. In a region separated as a photograph region by the segmentation process section 408, a binarizing or multi-level dithering process is executed in a screen suitable for tone reproducibility.

The image data having been subjected to the aforementioned processes is once stored in the storage unit 300 and is read at prescribed timing to be inputted to the image output apparatus 700. The image output apparatus 700 prints (forms) an image based on the image data on a recording medium (such as paper). Examples of a method for printing the image based on the image data are the electrophotographic method and the ink-jet method. The method for printing the image data is, however, not specified. It is noted that the aforementioned processes are executed by a CPU (not shown).

Figure 18A:
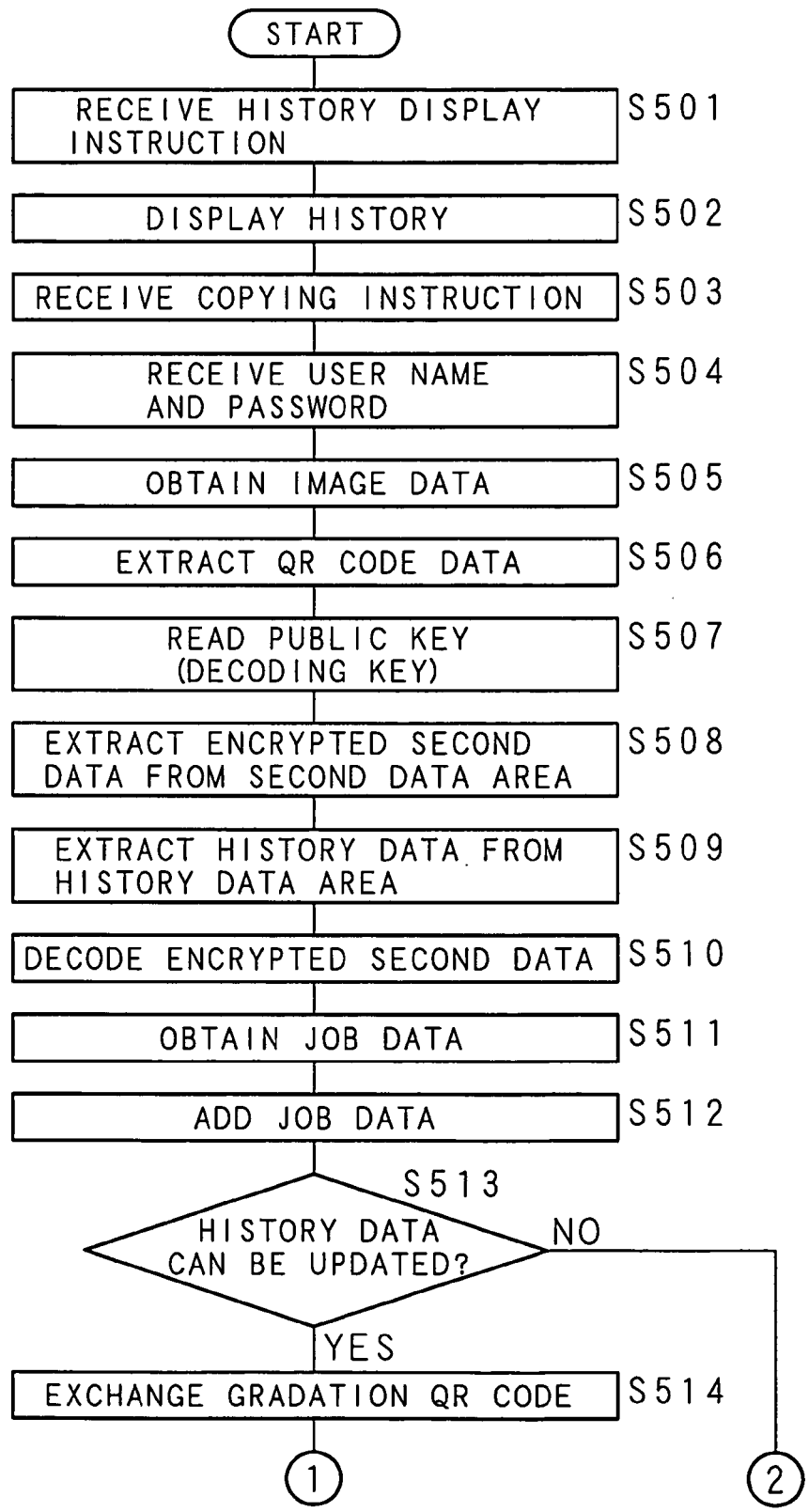
FIGS. 18A and 18B are flowcharts of processing executed by the digital multi-function peripheral of Embodiment 4 on a document to which a gradation QR code has been added.
Figure 18B:
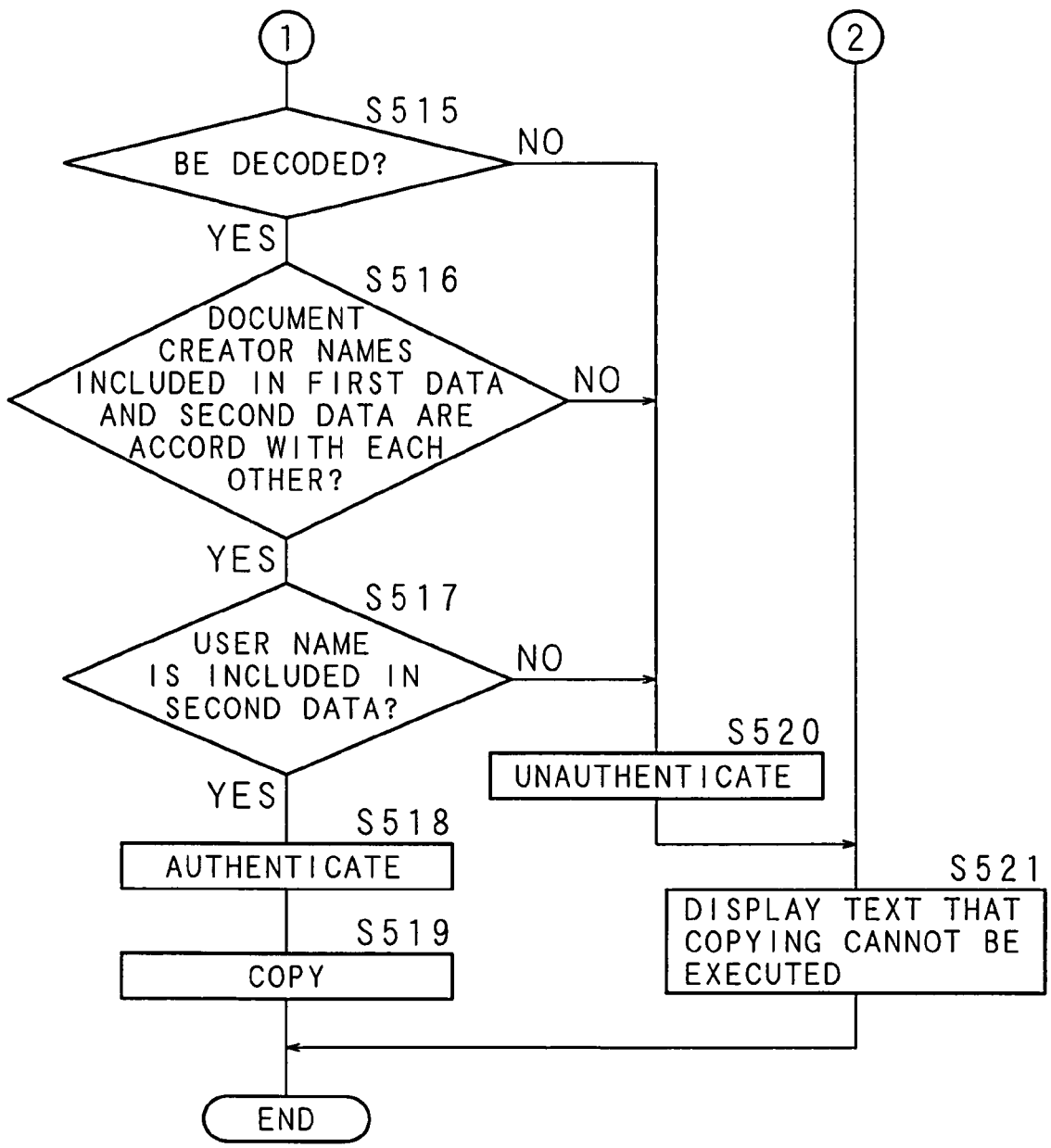

FIGS. 18A and 18B are flowcharts of processing executed by the digital multi-function peripheral 1 of Embodiment 4 on a document to which a gradation QR code has been added. In the following description, it is assumed that a document (image data) to which a gradation QR code has been added is handled by the digital multi-function peripheral 1 of Embodiment 4. It is exemplarily assumed for convenience that a copying restricted document that is allowed to be copied by specific persons alone is to be copied by a prescribed user. Furthermore, a gradation QR code including history data (i.e., a gradation QR code not updated yet) is added to the copying restricted document and the user displays an image based on the history data on the display section 501 and checks the history.

It is also assumed for convenience that a second data area and a history data area are defined as a format in the gradation QR code. Furthermore, QR code data corresponds to a document creator name (first data), and second data expressed by a micro gradation in the QR code corresponds to a document creator name and names of copying allowed persons allowed to copy the document. Similarly, the history data is expressed as a micro gradation. Incidentally, it is exemplarily assumed that the storage unit 300 stores data in which a user name, a password of each user and a secret key (and a public key) of each user are associated with one another.

Before copying the copying restricted document, the user operates a "history display" button of the control panel 500 for checking the history of handling (processing) of the copying restricted document. The CPU of the control unit 100 receives, through the control panel 500, a history display instruction from the user to display an image based on the history data on the display section 501 (Step S501).

In response to the history display instruction, the CPU specifies the position of the gradation QR code on the basis of cut-out symbols of the gradation QR code of the copying restricted document, and reads the history data of the micro gradation expressed in the history data area of the gradation QR code. Then, the CPU displays the image based on the history data on the display section 501 (Step S502). The user can check, in accordance with the image based on the history data displayed on the display section 501, the history of the handling the copying restricted document, such as time when the copying restricted document was handled, a person having handled the document and the content of the handling.

Next, the CPU receives a copying instruction from the user through the control panel 500 (Step S503). When the instruction is received from the user, the CPU displays, by using a program stored in the storage unit 300, an input screen for urging to input a user name and a password on the display section 501. When the user inputs the user name and the password by operating the control panel 500 in response to the displayed input screen, the CPU receives the user name and the password (third data) from the user through the display panel 500 (Step S504).

At this point, the CPU stores, in a RAM, job data in which the user name received in Step S504 and data corresponding to the executed processing (copying in this case) and the date of the execution are associated with each other.

Next, the CPU instructs the image reading apparatus 200 to read an image of the copying restricted document, so as to obtain image data of the copying restricted document (Step S505).

Furthermore, the CPU instructs the QR code data obtaining section 442 to extract (separate) the QR code data from the image data of the copying restricted document (Step S506). In response to the instruction of the CPU, the QR code data obtaining section 442 specifies the position of the gradation QR code on the basis of the cut-out symbols of the gradation QR code, extracts the QR code data from the image data of the copying restricted document, and obtains a document creator name (first data).

Thereafter, the CPU reads a public key (a decoding key) to be used for decoding encrypted second data from data stored in the storage unit 300 on the basis of the document creator name extracted from the gradation QR code (Step S507). The method for obtaining the public key is not limited to this. The CPU may receive the public key from the user through the control panel 500. The obtained public key is temporarily stored in the RAM of the control unit 100.

Subsequently, the CPU instructs the micro gradation data obtaining section 443 to specify the position of the gradation QR code on the basis of the cut-out symbols of the gradation QR code and to extract (separate) data of a micro gradation expressed in the second data area of the gradation QR code (namely, encrypted second data) (Step S508). In response to the instruction of the CPU, the micro gradation data obtaining section 443 extracts the encrypted second data expressed as the micro gradation in the second data area of the gradation QR code so as to obtain the encrypted second data.

In this case, since the micro gradation based on the encrypted second data is expressed in the QR code based on the first data, the position where the second data is added can be easily visually known.

Furthermore, the CPU instructs the micro gradation data obtaining section 443 to specify the position of the gradation QR code on the basis of the cut-out symbols of the gradation QR code and to extract (separate) history data expressed as the micro gradation in the history data area of the gradation QR code (Step S509). In response to the instruction of the CPU, the micro gradation data obtaining section 443 extracts the history data expressed as the micro gradation in the history data area of the gradation QR code, so as to obtain the history data (the history data not updated yet).

Moreover, the CPU instructs the decoding section 444 to decode the encrypted second data obtained in Step S508 (Step S510). In response to the instruction of the CPU, the decoding section 444 reads the public key stored in the RAM of the control unit 100 and decodes the encrypted second data by using the public key.

The CPU instructs the job obtaining section 447 to read the job data stored in the RAM so as to obtain the job data (Step S511).

Next, the CPU adds the job data obtained in Step S511 to the history data extracted in Step S509 (Step S512). Thereafter, the CPU determines whether or not the history data expressed as the micro gradation in the history data area can be updated in the gradation QR code of the copying restricted document (Step S513). This determination is substantially the same as that described in Embodiment 2 and hence the detailed description is omitted.

When it is determined that the history data can be updated (Step S513: YES), the CPU instructs the gradation QR code exchange section 446 to exchange the gradation QR code added to the copying restricted document (Step S514).

More specifically, the gradation QR code exchange section 446 generates image data of a gradation QR code in which the history data has been updated (namely, generates updated additional image data) and adds the generated image data instead of the image data of the gradation QR code not updated yet. In the gradation QR code in which the history data has been updated, a QR code is generated on the basis of the QR code data sent from the QR code data obtaining section 422 and a micro gradation is generated on the basis of the second data decoded in Step S510 and the history data to which the job data has been newly added in Step S512.

On the other hand, when it is determined that the history data cannot be updated (Step S513: NO), the CPU displays a text that the copying restricted document cannot be copied on the display section 501 of the control panel 500 (Step S521).

Next, the CPU determines whether or not the encrypted second data has been decoded by the decoding section 444 (Step S515). When it is determined that the encrypted second data has not been decoded by the decoding section 444 (Step S515: NO), the CPU unauthenticates the copying restricted document (the image data) as an unreliable document (Step S520). In this case, the CPU displays a text that the copying restricted document cannot be copied on the display section 501 of the control panel 500 (Step S521).

Thereafter, the CPU may cancel the copying instruction received in Step S503, discard the read image data of the copying restricted document, inform the creator of the document including the gradation QR code through the communication unit 600, or the like. In this manner, a person other than the specific persons desired by the creator of the copying restricted document can be restricted to use the copying restricted document.

On the other hand, when the encrypted second data has been decoded by the decode section (Step S515: YES), the CPU determines whether or not the document creator name included in the QR code data (the first data) accords with the document creator name included in the second data having been decoded by the decoding section 444 (Step S516). This procedure is executed by the CPU instructing the comparison section 448 to compare the QR code data (the first data) with the second data.

When it is determined that the document creator name included in the QR code data does not accord with the document creator name included in the second data (Step S516: NO), the CPU unauthenticates the copying restricted document (the image data) as an unreliable document (Step S520). In this case, a text that the copying restricted document cannot be copied is displayed on the display section 501 of the control panel 500 (Step S521).

On the other hand, when it is determined that the document creator name included in the QR code data accords with the document creator name included in the second data (Step S516: YES), the CPU instructs the comparison section 448 to determine whether or not the user name (the third data) received in Step S504 is included in a list of the copying allowed persons included in the second data having been decoded by the decoding section 444 (Step S517).

When it is determined that the user name is not included in the list of the copying allowed persons (the second data) (Step S517: NO), the CPU unauthenticates the user as an unreliable person (Step S520). In this case, the CPU displays a text that the copying restricted document cannot be copied on the display section 501 of the control panel 500 (Step S521).

On the other hand, when it is determined that the user name is included in the list of the copying allowed persons (the second data) (Step S517: YES), the CPU authenticates the user as a reliable person (Step S518). Then, the CPU copies the copying restricted document (the image data) in accordance with the copying instruction received in Step S503 (Step S519).

The CPU instructs the gradation QR code exchange section 446 to exchange the image data of the gradation QR code not updated yet obtained in Step S506 with the image data of the updated gradation QR code (the updated additional image data). Then, the CPU instructs the image output apparatus 700 to form an image based on the image data in which image data of the updated gradation QR code (the updated additional image data) has been added.

Like reference numerals are used to refer to like elements used in Embodiment 1 or 2 so as to omit the detailed description.

Although a document is copied in the aforementioned exemplary case, the application of the digital multi-function peripheral 1 of Embodiment 4 is not limited to this. For example, the digital multi-function peripheral 1 of Embodiment 4 is applicable also when the digital multi-function peripheral 1 includes a facsimile transmitting function, a scan to e-mail function or the like and obtained image data of a document is to be sent/received to/from an external device.

For example, when the digital multi-function peripheral 1 includes a communication unit having a modem and a network card so as to send data by facsimile, a procedure with a partner for sending is executed by using the modem. When a state ready for sending the facsimile is attained, the digital multi-function peripheral 1 executes necessary processing such as change of the encoding format on image data of a document encoded in a prescribed format (i.e., image data read with a scanner), and successively transmits the image data having been processed to the destination through a communication line.

Furthermore, when the digital multi-function peripheral 1 receives image data, the CPU executes a communication procedure for receiving image data from a sender and receives image data from a partner. The image data received by the digital multi-function peripheral 1 is decoded by an encode/decode process section (not shown). A rotation process and a process for changing the resolution are executed on the decoded image data if necessary. Thereafter, output tone correction and tone reproduction are executed on the image data and the executed image data is outputted from the image output apparatus.

Embodiment 5

Figure 19:
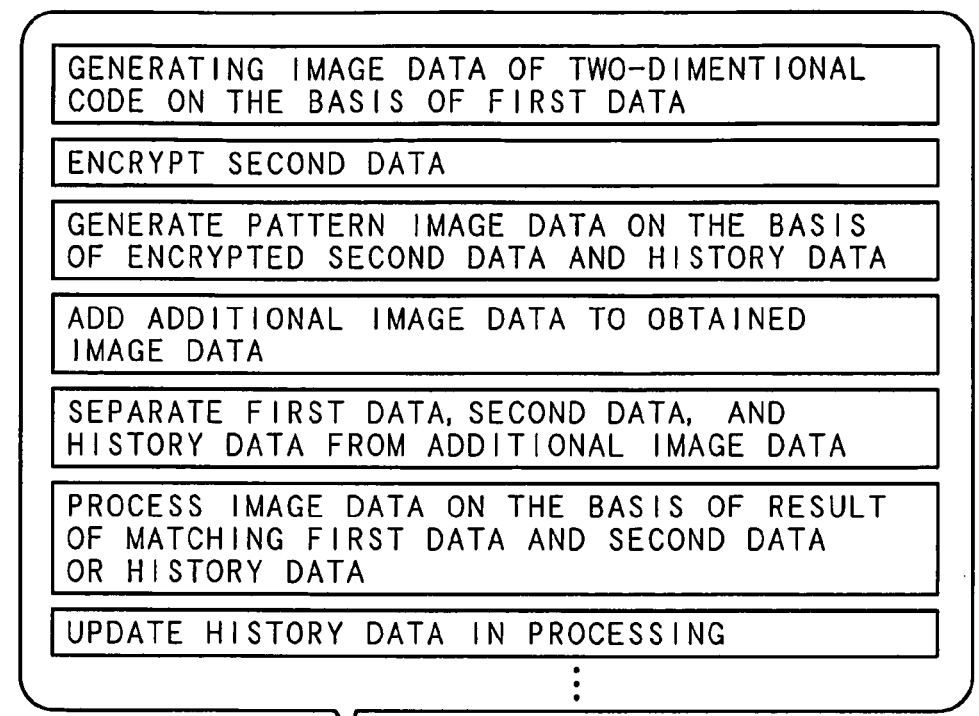
FIG. 19 is a block diagram illustrating a principal configuration of a digital multi-function peripheral according to Embodiment 5.
Figure 19:
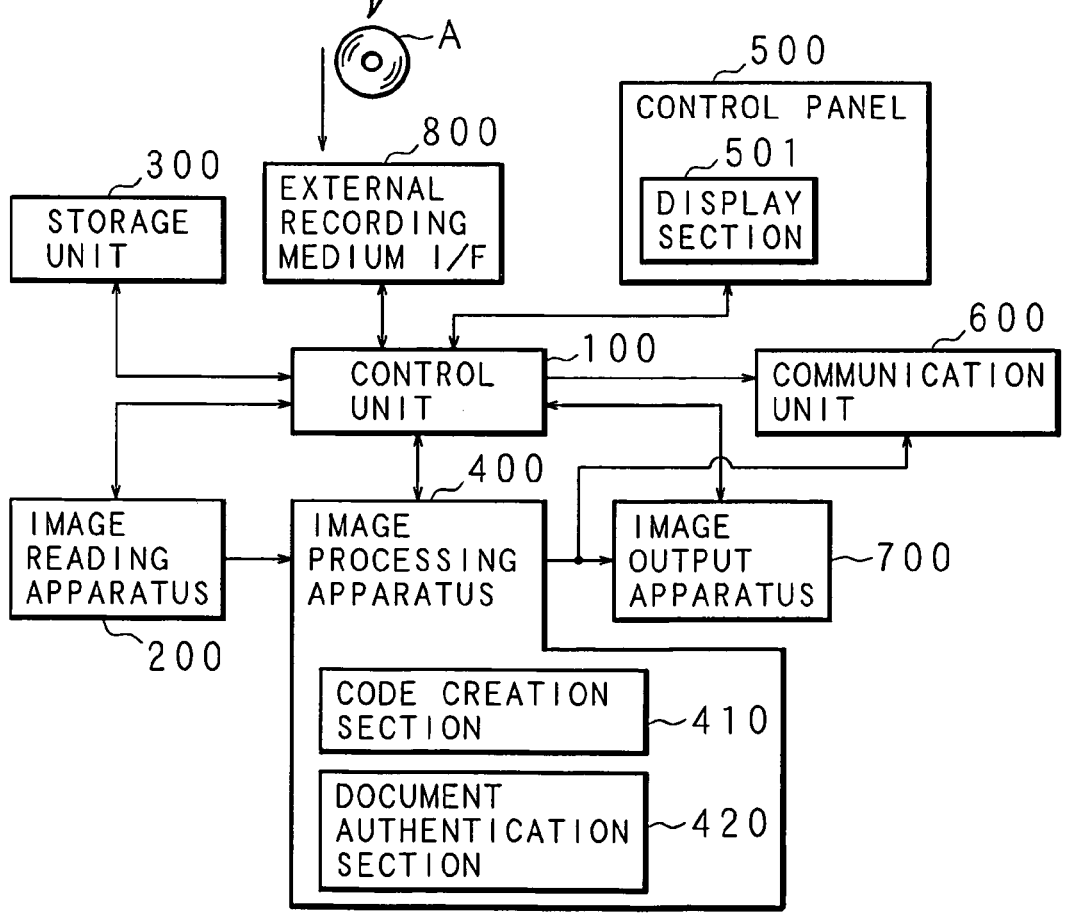
Figure 20A:
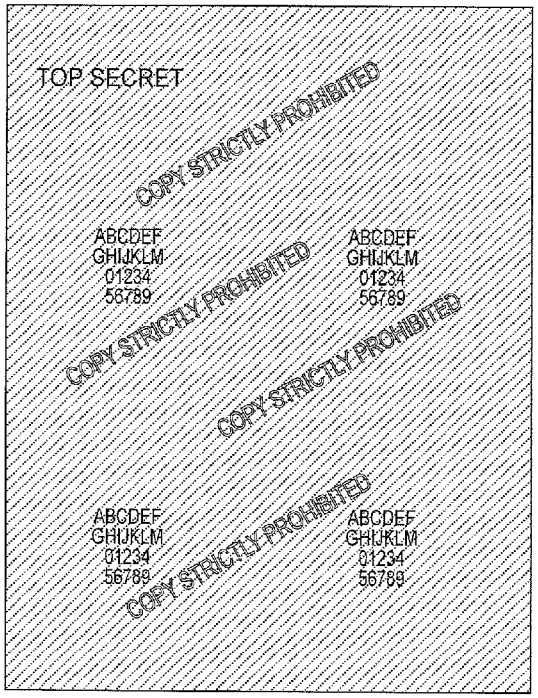
FIGS. 20A and 20B are explanatory diagrams explaining a conventional text hiding technique using visible watermark information in halftone screens.
Figure 20B:
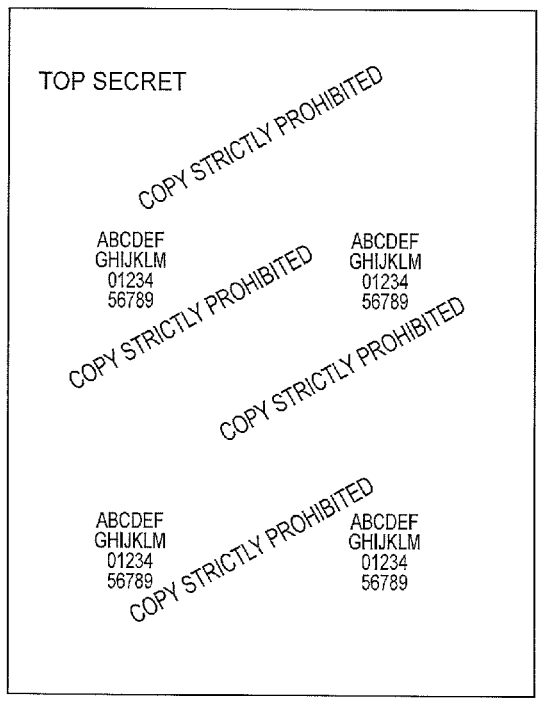

FIG. 19 is a block diagram illustrating a principal configuration of a digital multi-function peripheral 1 according to Embodiment 5. In the digital multi-function peripheral 1 of Embodiment 5, a program for executing processing can be provided in the form of a portable recording medium A such as a CD-ROM (Compact Disc Read-Only Memory) through an external recording medium I/F 800. Furthermore, in the digital multi-function peripheral 1 of Embodiment 5, a computer program can be downloaded from an external device (not shown) through a communication unit 600. This embodiment will now be described in detail.

The digital multi-function peripheral 1 of Embodiment 5 includes an externally (or internally) provided recording medium reading apparatus (not shown). In the digital multi-function peripheral 1 of Embodiment 5, the portable recording medium A storing programs described later and the like is inserted into the recording medium reading unit, so as to install the programs on, for example, a storage unit 300. The programs stored in the portable memory medium A are, for example, a program for allowing the digital multi-function peripheral 1 to generate image data of a two-dimensional code including a plurality of cells on the basis of first data for security of obtained image data, to encrypt second data for security of obtained image data, to generate pattern image data corresponding to a micro gradation (a gradation pattern) in the two-dimensional code on the basis of encrypted second data and history data corresponding to a history of processing, to add, to the image data, additional image data based on the image data of the two-dimensional code and the pattern image data, to separate (extract) first data, second data and history data from the additional image data, to match the first data and the second data with each other, to process the image data in accordance with the result of the match or the history data, and to update history data in a processing. These programs are executed by loading them on a RAM of a control unit 100. As a result, the digital multi-function peripheral 1 of Embodiment 5 functions as the image forming apparatus of Embodiments 1 through 4.

The recording medium may be a memory (not shown) necessary for executing processing by a microcomputer, such as a program medium like a ROM. Alternatively, the recording medium may be a medium fixedly storing a program code, such as a tape, a magnetic disc, an optical disc, a card or a semiconductor memory. Examples of the tape are a magnetic tape and a cassette tape. Examples of the magnetic disc are a flexible disc and hard disc. Examples of the optical disc are a CD-ROM, an MO (MagnetoOptic disc), an MD (Magnetic Disc) and a DVD (Digital Versatile Disc). Examples of the card are an IC (Integrated Circuit) card (including a memory card) and an optical card. Examples of the semiconductor memory are a mask ROM, an EPROM (Erasable Programmable Read-Only Memory), an EEPROM (Electrically Erasable and Programmable Read-Only Memory), and a flash ROM (Read-Only Memory).

The recording medium may be a medium on which a program code is downloaded through the communication unit 600 from a communication network so as to fluidally store the program code. Incidentally, when a program is downloaded from a communication network, a program for the download should be precedently stored in a main part of the apparatus or should be installed from a recording medium. It is noted that the present invention may be practiced also by a digital multi-function peripheral that receives an electronically sent program code and executes the program in accordance with computer data signals embedded in carriers.

Like reference numerals are used to refer to like elements used in Embodiment 1 or 2 so as to omit the detailed description.

As this description may be embodied in several forms without departing from the spirit of essential characteristics thereof, the present embodiments are therefore illustrative and not restrictive, since the scope is defined by the appended claims rather than by the description preceding them, and all changes that fall within meters and bounds of the claims, or equivalence of such metes and bounds thereof are therefore intended to be embraced by the claims.

What is claimed is:

1. An image processing apparatus for obtaining image data and performing a processing of the obtained image data, comprising:
    a code generation section for generating image data of a two-dimensional code including a plurality of cells on the basis of first data for security of the obtained image data;
    an encryption section for encrypting second data for security of the obtained image data;
    a pattern generation section for generating pattern image data expressing at least one kind of gradation pattern in each cell of the two-dimensional code on the basis of the encrypted second data and history data corresponding to a history of the processing; and
    an addition section for adding, to the obtained image data, additional image data to be added to the obtained image data on the basis of the generated image data of the two-dimensional code and the generated pattern image data.

2. The image processing apparatus according to claim 1, wherein gradation patterns respectively corresponding to the encrypted second data and the history data are formed in the two-dimensional code respectively in different areas.

3. An image processing apparatus, comprising:
    an obtaining section for obtaining image data to which the additional image data has been added by the image processing apparatus according to claim 1;
    a separation section for separating the first data, the second data and the history data from the additional image data;
    a matching section for determining whether or not the first data and the second data separated by the separation section have an association with each other;
    a process section for executing a processing of the image data in accordance with a result of match obtained by the matching section and/or the history data; and
    a history update section for updating the history data in executing the processing.

4. The image processing apparatus according to claim 3, wherein the history update section includes:
    a history addition section for adding, in executing a processing, process log data corresponding to a job which is carried out to the history data not updated yet; and
    an updated pattern generation section for generating pattern image data expressing a gradation pattern in each cell of the two-dimensional code on the basis of the updated history data to which the process log data has been added.

5. The image processing apparatus according to claim 4, wherein the history update section further includes:
    a determination section for determining whether or not the history data is able to be updated on the basis of a capacity of the updated history data or the process log data.

6. The image processing apparatus according to claim 5, further comprising:
    an updated additional image addition section for adding, to the image data, updated additional image data including the pattern image data generated by the updated pattern generation section instead of the additional image data in accordance with a result of determination obtained by the determination section.

7. The image processing apparatus according to claim 3, further comprising:
an output section for performing output on the basis of the history data.

8. The image processing apparatus according to claim 3, further comprising:
a receiving section for receiving third data which is different from the first data and the second data,
wherein the matching section determines whether or not the third data received by the receiving section has an association with the first data or the second data.

9. An image reading apparatus, comprising:
the image processing apparatus according to claim 3; and
a read section for reading image data from a document,
wherein in a case where the read section reads image data to which the additional image data has been added, the separation section separates the first data, the second data and the history data from the additional image data, a processing of the read image data is executed in accordance with a result of match obtained by the matching section and/or the history data, and the history data is updated in executing the processing.

10. An image forming apparatus comprising:
the image processing apparatus according to claim 3,
wherein in a case where image data to which the additional image data has been added is obtained, an image based on the obtained image data is formed on a sheet in accordance with a result of match obtained by the matching section and/or history data of the image data, and the history data is updated in forming the image.

11. An image reading apparatus, comprising:
the image processing apparatus according to claim 1,
wherein the image processing apparatus adds the additional image data to image data read from a document.

12. An image forming apparatus, comprising:
the image processing apparatus according to claim 1,
wherein an image based on image data to which the additional image data has been added by the image processing apparatus is formed on a sheet.

13. A non-transitory computer-readable recording medium which is recorded a computer program for making a computer obtain image data and perform a processing of the obtained image data, the computer program comprising:
a code generation step of causing the computer to generate image data of a two-dimensional code including a plurality of cells on the basis of first data for security of the obtained image data;
an encryption step of causing the computer to encrypt second data for security of the obtained image data;
a pattern generation step of causing the computer to generate pattern image data expressing at least one kind of gradation pattern in each cell of the two-dimensional code on the basis of the encrypted second data and history data corresponding to a history of the processing; and
an addition step of causing the computer to add, to the obtained image data, additional image data to be added to the obtained image data on the basis of the generated image data of the two-dimensional code and the generated pattern image data.

14. A non-transitory computer-readable recording medium recording a computer program, the computer program comprising:
an obtaining step of causing a computer to obtain image data to which the additional image data has been added by the computer program recorded in the recording medium according to claim 13;
a separation step of causing the computer to separate the first data, the second data and the history data from the additional image data;
a matching step of causing the computer to match the first data and the second data separated in the separation step;
a process step of causing the computer to execute a processing of the image data in accordance with a result of match obtained in the matching step and/or the history data; and
a history update step of causing the computer to update the history data in executing the processing.

15. The recording medium according to claim 14,
wherein the history update step includes:
a history addition step of causing the computer to add process log data corresponding to a job which is carried out to the history data not updated yet in executing the processing; and
a history pattern generation step of causing the computer to generate pattern image data expressing a gradation pattern in each cell of the two-dimensional code on the basis of the updated history data to which the process log data has been added.

16. The recording medium according to claim 14,
wherein the history update step includes:
a determination step of causing the computer to determine whether or not the history data is able to be updated on the basis of a capacity of the updated history data or the process log data.

\* \* \* \* \*